United States Patent
Michielsen et al.

(10) Patent No.: US 12,515,409 B2
(45) Date of Patent: Jan. 6, 2026

(54) METHOD AND SYSTEM FOR MANUFACTURING A THREE-DIMENSIONAL POROUS STRUCTURE

(71) Applicant: VITO NV, Mol (BE)

(72) Inventors: Bart Michielsen, Mol (BE); Jasper Lefevere, Mol (BE); Wim Bouwen, Mol (BE); Steven Mullens, Mol (BE); Marijn Gysen, Mol (BE); Erwin Van Hoof, Mol (BE)

(73) Assignee: VITO NV, Mol (BE)

( * ) Notice: Subject to any disclaimer, the term of this patent is extended or adjusted under 35 U.S.C. 154(b) by 602 days.

(21) Appl. No.: 17/569,933

(22) PCT Filed: Jul. 17, 2020

(86) PCT No.: PCT/EP2020/070354
§ 371 (c)(1),
(2) Date: Jan. 6, 2022

(87) PCT Pub. No.: WO2021/013749
PCT Pub. Date: Jan. 28, 2021

(65) Prior Publication Data
US 2023/0347595 A1 Nov. 2, 2023

(30) Foreign Application Priority Data

Jul. 19, 2019 (EP) .................................. 19187416

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/118* (2017.08); *B29C 64/255* (2017.08);
(Continued)

(58) Field of Classification Search
CPC ... B29C 64/393; B29C 64/118; B29C 64/255; B29C 64/209; B29K 2105/04
See application file for complete search history.

(56) References Cited

U.S. PATENT DOCUMENTS

| 7,527,671 B1 | 5/2009 | Stuecker et al. |
| 8,955,558 B2 * | 2/2015 | Bosveld ................ B29C 64/329 141/2 |

(Continued)

FOREIGN PATENT DOCUMENTS

| CN | 109895390 A | 6/2019 |
| DE | 102017007178 A1 | 2/2018 |

(Continued)

OTHER PUBLICATIONS

International Search Report and Written Opinion—PCT/EP2020/070354—mailing date Sep. 28, 2020.

(Continued)

*Primary Examiner* — JaMel M Nelson
*Assistant Examiner* — Erica Hartsell Funk
(74) *Attorney, Agent, or Firm* — Banner & Witcoff, Ltd.

(57) ABSTRACT

A method and system for manufacturing a three-dimensional porous structure. Filaments are deposited in a predetermined interconnected arrangement in a plurality of stacked layers for forming a porous structure with interconnected pores. A pressure value indicative of a pressure being applied on the build material in the build material reservoir of a nozzle used for deposition is monitored during deposition of the filaments. The processing unit is configured to adjust at least one extrusion parameter in order to compensate for the irregular rising and/or falling of the pressure value.

18 Claims, 13 Drawing Sheets

(51) Int. Cl.
*B29C 64/255* (2017.01)
*B33Y 10/00* (2015.01)
*B33Y 30/00* (2015.01)
*B33Y 50/02* (2015.01)
*B29K 105/04* (2006.01)

(52) U.S. Cl.
CPC .............. *B33Y 10/00* (2014.12); *B33Y 30/00* (2014.12); *B33Y 50/02* (2014.12); *B29K 2105/04* (2013.01)

(56) References Cited

U.S. PATENT DOCUMENTS

| | | | |
|---|---|---|---|
| 10,265,911 B1 * | 4/2019 | Capri | G06T 7/001 |
| 2017/0232679 A1 | 8/2017 | Gardiner et al. | |
| 2017/0259507 A1 | 9/2017 | Hocker | |
| 2017/0368758 A1 | 12/2017 | Touma | |
| 2018/0272599 A1 * | 9/2018 | Rodriguez | B29C 64/321 |
| 2019/0118258 A1 * | 4/2019 | Sachs | B29C 64/393 |
| 2019/0168300 A1 | 6/2019 | Gelbart | |
| 2019/0217546 A1 * | 7/2019 | Bosveld | B29C 64/227 |

FOREIGN PATENT DOCUMENTS

| | | |
|---|---|---|
| EP | 2883685 A1 | 6/2015 |
| EP | 3476898 A1 | 5/2019 |
| EP | 3486068 A1 | 5/2019 |
| RU | 2676989 C1 | 1/2019 |
| WO | 2015147939 A1 | 10/2015 |
| WO | 2017100783 A1 | 6/2017 |
| WO | 2017100853 A1 | 6/2017 |
| WO | 2018081154 A1 | 5/2018 |
| WO | 2019023119 A1 | 1/2019 |
| WO | 2019068685 A1 | 4/2019 |

OTHER PUBLICATIONS

International Search Report and Written Opinion—PCT/EP2020/070384—mailing date Oct. 12, 2020.
International Search Report and Written Opinion—PCT/EP2020/070356—mailing date Sep. 29, 2022.
International Search Report and Written Opinion—PCT/EP2020/070342—mailing date Oct. 14, 2020.

* cited by examiner

METHOD AND SYSTEM FOR MANUFACTURING A THREE-DIMENSIONAL POROUS STRUCTURE

CROSS-REFERENCE TO RELATED APPLICATIONS

This application is a U.S. National Stage application under 35 U.S.C. § 371 of International Application PCT/EP2020/070354 (published as WO 2021/013749 A1), filed Jul. 17, 2020, which claims the benefit of priority to Application EP 19187416.3, filed Jul. 19, 2019. Benefit of the filing date of these prior applications is hereby claimed. Each of these prior applications is hereby incorporated by reference in its entirety.

FIELD OF THE INVENTION

The invention relates to a method and system for manufacturing a three-dimensional porous structure by extruding filaments. The invention is further related to a computer program product.

BACKGROUND TO THE INVENTION

Additive manufacturing is currently widely used and various techniques exist. It can help building a structure layer-by-layer and the manufactured structure can be employed in various applications.

Extrusion-based additive manufacturing methods have been employed for fabrication of porous structures. A material (e.g. paste, polymers, hydrogels, etc.) is extruded through a nozzle in the form of filaments. A certain arrangement of filaments can be obtained by relative movement of the nozzle with respect to a print bed during deposition. During the material extrusion, filaments are extruded from a nozzle and positioned relative to one another according to a predetermined pattern providing the desired properties of the manufactured porous structure. The lay-down pattern is determined by the print path and has major impact on the properties of the printed structure. In this way, complex geometries and porous structures can be obtained with a fully interconnected network of pores which may be required for some applications.

The printing process may not always result in a desired porous structure. The printed porous structure may not have the desired characteristics as a result of abnormalities or deviations during the printing process. There is a need for determining and ability to adjust the quality of the printing process objectively in order to be able to guarantee one or more properties (e.g. structural integrity, porosity, etc.) of the manufactured porous structure.

Often possible malformations being present within the porous structure are not easily observable when the final porous structure is obtained. Such malformations may not be visible externally. However, they can have significant impact on the specifications and/or quality of the porous structure. As a result, it may be challenging to produce porous structures with great accuracy and reproducibility using conventional printing processes. Also the mechanical and porous characteristics of the porous structures may be rather difficult to predict.

The existing systems and methods can be cumbersome and difficult to implement in the field. There is a need for improving the printing process of porous structures manufactured by an extrusion based printing process using a build material comprising inorganic particulate material. There is a desire for a system and method which is less complex, intrusive and/or expensive. Furthermore, it is desired to enhance the printing quality and suitability for printing porous structures for a wider range of applications.

SUMMARY OF THE INVENTION

It is an object of the invention to provide for a method and a system that obviates at least one of the above mentioned drawbacks.

Additionally or alternatively, it is an object of the invention to improve the additive manufacturing process for three-dimensional porous structures made using a build material comprising at least one inorganic particulate material.

Additionally or alternatively, it is an object of the invention to better guarantee the printing quality or the quality of porous structures.

Additionally or alternatively, it is an object of the invention to improve the efficiency of an extrusion based additive manufacturing process that makes use of a build material comprising at least one inorganic particulate material for fabricating porous structures.

Thereto, the invention provides for a method for manufacturing a three-dimensional porous structure, the method including the steps of: providing an extrusion unit comprising a nozzle with a nozzle outlet and a build material reservoir, the build material reservoir being in fluid communication with said nozzle outlet, the build material comprising particles of inorganic material dispersed in a binder and at least one solvent; depositing, by means of the extrusion unit, filaments of build material in a predetermined interconnected arrangement in a plurality of stacked layers for forming the three-dimensional porous structure with interconnected pores; monitoring, by means of a measuring unit, a pressure value indicative of a pressure being applied on the build material in the build material reservoir during extrusion of the build material through the nozzle to achieve deposition of the filaments; and processing, by means of a processing unit, the monitored pressure value for detecting one or more deposition irregularities by identifying an irregular rising and/or falling of the pressure value with respect to a plateau level reached during extrusion, wherein during the irregular rising the pressure value momentary spikes before it returns to its plateau level, wherein during the irregular falling the pressure value momentary drops before it returns to its plateau level, and wherein the processing unit is configured to adjust at least one extrusion parameter in order to compensate for the irregular rising and/or falling of the pressure value.

Advantageously, possible printing errors can be prevented by compensating irregularities in the pressure value as they develop. Instead of abruptly interrupting the process as a result of already formed irregularities in the printed structure, the invention enables to adjust printing parameters and/or conditions in order to compensate for or even prevent irregularities in the build material dispensed by the nozzle such as to be able to provide a stable printing operation without (or at least reduced) printing errors. The severity of printing errors can be effectively reduced.

The evolution of the pressure value in function of time during deposition of the filaments can be indicative of the deposition quality. A fluctuation may indicate an irregular extrusion of build material from the nozzle and/or an irregular deposition of the filament, which can result in an irregularity in the deposited filament. From the way the pressure value (or other value indicative of the pressure value, e.g. force) diverges or fluctuates during deposition of the filaments, it can be deduced whether deposition defects risk to occur in the manufactured porous structure as well as the severity or seriousness of the deposition defects. Events or patterns in the pressure value data can be identified for determining the cause of the deposition defects.

Advantageously, the invention provides an accurate way to not only detect potential problems at an early stage but also to compensate, prevent or minimize them while filament deposition is going on, in such a way that errors upon extrusion are prevented or minimized. In particular, the present invention provides a way to adjust one or more deposition parameters while the build material is travelling towards and through the nozzle, so that problems with build material travelling through the nozzle and/or being extruded from the nozzle can be compensated to a desired extent in advance of filament deposition. The presence of poorly printed portions or defects in the deposited filaments can in that way be reduced to a minimum or at least the seriousness thereof in the deposited filaments can be reduced. The present invention thus provides a way to reduce or even prevent the occurrence of poorly printed portions or defects in the deposited filaments, while the filaments are being produced. In this way, an optimal structural integrity of the porous structure can be better guaranteed. The use of pressure/force data can be particularly advantageous over the use of flow data coming from flow sensors, as a more simple and cost-effective design can be achieved.

By monitoring one or more of the above-mentioned parameters, it can be more accurately determined whether there is a risk to the formation of one or more poorly-printed portions for example affecting the quality and/or integrity of the structure. Possible printing defects can be better and faster identified in the course of the printing process using a cost-effective arrangement. It may thus no longer be necessary to post-inspect the porous structure. Possible defects can be detected and be at least partially compensated for on-the-fly during the printing process. Material losses may this way be reduced, in particular the severity of the defects and/or the number of three-dimensional structures containing defects may be reduced. The defects in the porous structure may relate to deposition defects identified using the method according to the invention.

The pressure value can be monitored during discharge of the filaments by the extrusion unit. Based on the monitored data of the pressure value, the quality of the deposition of the filaments can be evaluated. This may be performed in real-time and the filament deposition parameter or parameters may be adjusted in real-time. For example, during normal deposition of the filaments, the pressure value may remain within a plateau level (which can be a range or an envelope). With other words, the pressure value may be variant within a predefined range or envelope. In some examples, the pressure value has a substantially straight slope. However, sudden spikes or dips of the pressure value with respect to the plateau level of the pressure value (cf. breaking out of a range or envelope) may indicate an irregular discharge of build material through the nozzle opening. This irregular discharge is linked to an imminent deposition defect influencing the characteristics of the manufactured porous structure. The present invention permits to adjust an extrusion parameter and to at least partly remedy the severity of such deposition defects, or even to prevent them.

A discharge irregularity may have significant impact on the characteristics and mechanical properties, such as integrity, mechanical strength, pressure resistance, etc., of the manufactured porous structure. A quantity relating to the pressure applied on the build material in the build material reservoir for discharging said build material through the nozzle opening can be monitored and processed for effectively identifying the risk to the formation of one or more discharge irregularities. The data processing enables an accurate and objective characterization of the porous structure being formed. The discharge irregularities are linked to irregular rising and/or falling of the data indicative of said pressure applied on the build material in the fluid reservoir.

A pattern in the monitored pressure value data can be linked to an irregularity during extrusion. For instance, when the data is represented in a graph in function of time, an unexpected spike or dip fluctuation can be visible. Such spike fluctuation or dip fluctuation in the data can indicate that the deposition of the filaments was irregular at the moment at which the spike or dip fluctuation occurred.

The properties of the porous structure being manufactured can be affected by conditions during deposition of the filaments by means of the nozzle, and these conditions can be adjusted in this invention while the filaments are being deposited so as to control the deposition process towards desired properties of the porous structure. Potential deposition errors in the manufactured structure can be effectively prevented.

For example, the nozzle may deposit filaments incorrectly for instance due to a blockage at the nozzle opening or within the supply line to the nozzle. As a result of a blockage, pressure may build up, the supply line or nozzle may be partially blocked and less build material may be deposited through the nozzle opening. If sufficient pressure has built up to a certain extent, the blockage can be overcome by a certain build material discharge through the nozzle opening. As a result of this irregular deposition of the filaments, the filaments may locally be deformed and/or have a varying diameter. This can be linked to a defect of the porous structure which may significantly influence the quality of the manufactured product. Advantageously, the processing unit may control the extrusion unit such as to adjust an extrusion parameter in order to compensate for the irregular rising and/or falling of the pressure value.

Air voids within the build material may also result in deposition irregularities which can be detected. An air void within the material may result in a sudden drop of the pressure on the build material with respect to the plateau level. If the air void is removed through the nozzle opening during deposition, the sudden dip (cf. negative peak) may be followed by the pressure level approaching back the plateau level. However, as a result of the irregular drip/drop with respect to the plateau level, an irregular deposition of the filaments may have occurred, which can impact the quality of the manufactured product. The irregular deposition may induce a defect in the formed porous structure.

The monitored pressure value may have a first set of fluctuations, falling within a range of the plateau level, and a second set of fluctuations, at least partially reaching values outside the range of the plateau level, wherein the second set of fluctuations are used for identifying deposition irregularities. When the pressure value dips (i.e. drop), a (local) lowest point can be reached. When the pressure value peaks, a (local) highest point can be reached.

When the filaments are deposited in normal conditions, a pressure value can be reached falling within a plateau level. A sudden drop of the pressure value escaping the plateau level or a sudden increase of the pressure level escaping the plateau level can indicate deposition irregularity.

The processing unit may be configured to perform a peak analysis on the monitored pressure value. Positive and/or negative peaks escaping the plateau pressure level can be identified indicating a deposition irregularities linked to (manufacturing) defects of the porous structure.

The processing unit is configured to control the extrusion unit such as to adjust an extrusion parameter in order to compensate for the irregular rising and/or falling of the pressure value.

Optionally, adjusting an extrusion parameter involves at least one of: adjusting the pressure exerted to the build material in the build material reservoir and/or in the nozzle; adjusting the viscosity of the build material in the build material reservoir and/or in the nozzle; adjusting the build material flow rate; adjusting the nozzle opening; adjusting an actuation of an extrusion screw in the nozzle; or providing vibrations to the build material.

It will be appreciated that the pressure exerted to the build material may be adjusted at any position of the build material feed line before the print material leaves the nozzle.

Subjecting the print material to vibration can be carried out in different ways. In some examples, a piezoelectric actuator is used. The amplitude of the vibrations may be based on the required adjustment needed for compensating for the identified irregularities in the pressure. In some examples, the frequency of the vibrations is adjusted based on the identified irregularities.

Optionally, adjusting the viscosity of the build material in the build material reservoir is carried out by at least one of: adjusting a temperature of the build material, adjusting an amount of a solvent contained in the build material, or adding a release agent.

The heating/cooling can be carried out in the build material reservoir and/or in the nozzle. However, it will be appreciated that the heating/cooling can be carried out at any position of the build material feed line before the build material leaves the nozzle.

It will be appreciated that heating and/or cooling of the build material can be achieved in various ways, for instance including using resistive heating, microwave heating, using Peltier elements, employing induction heating, etc.

Optionally, the measuring unit includes a load sensor positionable at a build material reservoir, between build material reservoir and nozzle, and/or at the nozzle.

The load sensor may be configured to measure data indicative for pressure, wherein the processing unit is configured to process data provided by the load sensor.

Optionally, the measuring unit is configured to monitor the pressure value indicative of the pressure being applied on the build material at a plurality of positions.

Advantageously, the accuracy of the measurements can be significantly enhanced in this way, providing an improved control such as to be able to timely avoid possible printing irregularities by early compensation. Optionally, the measuring unit is configured to monitor the pressure value in the build material reservoir and the nozzle.

Optionally, an irregular rising and/or falling of the pressure value with respect to a plateau level reached during deposition is identified when a plateau-to-peak pressure value is larger than 15 percent, more preferably larger than 20 percent, even more preferably larger than 25 percent. These sudden fluctuations in the pressure value can be considered as key events which can result in defects in the porous structure being manufactured.

Optionally, the plateau level is a substantially even level (cf. range, band, envelope, etc.). It will be appreciated that a plateau can be understood as a region in which the quantity remains level or stable for an amount of time. The plateau may have a substantially even level. However, it is also possible the plateau level is slightly tilted (e.g. gradually decreasing or increasing).

Optionally, the processing unit is configured to link the one or more identified deposition irregularities to one or more deposition defects in the porous structure, wherein a severity of the deposition defect is determined based on an amplitude and/or shape of the irregular rising and/or falling of the pressure value with respect to the plateau level reached during deposition.

The amplitude and/or shape of the irregular rising and/or falling of the pressure value may indicate the impact on the deposition. This can be taken into account for determining how severe the defect of the porous structure is. Additionally or alternatively, as indicated already above, also the location of the deposition irregularity can be taken into account for determining the severity of the deposition defect.

The differences in amplitudes between a baseline of the plateau level and the (positive or negative) peak may provide an indication of the severity of the deposition defect.

Optionally, the number of irregular rising and/or falling of the pressure value with respect to the plateau level are taken into account for determining the severity of the defects of the manufactured porous structure.

Optionally, the processing unit is configured to determine a location of the identified deposition defect in the porous structure based on a position of the nozzle in a print path when the deposition irregularity is detected.

The print bed (e.g. printing platform, print surface) and the nozzle are moved with respect to each other during deposition of the filaments. For instance, the nozzle can be moved with respect to the print bed during deposition. Additionally or alternatively, the print bed is moved with respect to the nozzle during deposition. As a result, the location of the deposition defect resulting from the deposition irregularity can be determined, for example by monitoring the movement of the print bed and/or the nozzle.

In an example, the location of the deposition defect within the porous structure is determined based on a time step or time interval in which deposition irregularity occurred. Based on the time step or time interval, and on the print path, the location of irregularity in printing can be determined. In this way, the impact of the deposition defect on the porous structure can be indicated. Optionally, this impact can also be quantified or linked to a certain defect classification.

Optionally, the processing unit is configured to determine one or more defect (e.g. weakened) zones in the manufactured porous structure based on locations of identified one or more deposition defects in the porous structure.

A build material may be made with desired properties depending on the application for which it is to be used (cf. application of the porous structure). The pressure value applied on the build material in the build material reservoir during (normal) discharge of the filaments can be at a certain plateau level. This plateau level can be a range in which small variations are tolerated. The processing unit can be configured to process the data obtained during deposition of the filaments in order to identify a pattern linked to the extrusion irregularity. The pattern may be a sudden or steep peak or trough breaking out of the range of the plateau level. Such sudden fluctuations of the pressure indicates the deposition irregularity and thus the resulting defect in the porous structure.

Optionally, the processing unit is configured to estimate an impact of the one or more defect (e.g. weakened) zones on the structural integrity of the porous structure, based on at least one of a location and severity of the deposition defect at the defect zone, wherein the processing unit is configured to determine or estimate whether the printed porous structure complies with targeted properties, in particular one or more of strength and geometric effects, based on said estimate of the impact of the one or more weakened zones on the structural integrity of the porous structure.

Optionally, the processing unit is configured to adjust an extrusion parameter in order to compensate for the irregular rising and/or falling of the pressure value, based on the observed fluctuations of the pressure and the estimate of the impact of the one or more weakened zones on the structural integrity of the porous structure.

In some cases, the adjusted extrusion parameter may not be able to completely prevent formed deposition irregularities. The deposition irregularity may result in a defect in the formed porous structure which can influence the structural integrity of the porous structure. Based on a detected defect in the porous structure, it can be determined whether the porous structure complies with a target quality or strength of the porous structure to be manufactured.

Optionally, the processing unit employs a computational model for determining or estimating the impact of the one or more weakened zones on the structural integrity of the porous structure, wherein at locations of the one or more detected deposition defects the filament is modelled with a diameter based on the respective detected irregular rising or falling of the pressure value.

The location of the defect in the porous structure may be determined based on a moment at which the deposition irregularity occurred during manufacturing. The severity of the defect may depend i.a. on the location of the defect. This can be evaluated by the processing unit using a computational model. The computational model may for instance be based on an analytical model, an empirical model and/or a numerical model (e.g. finite element method). A hybrid model can also be employed. Additionally or alternatively, an artificial trained network can be used for determining whether a porous structure with identified deposition defects complies with desired properties. Other models may also be used. For instance, the model may map a location and/or a size of the defect to a predetermined impact factor being indicative of the severity of the defect. It is also envisaged that a plurality of models are used for evaluating the impact of the determined defect on the quality of the porous structure.

Optionally, the manufacturing of the porous structure is cancelled prematurely if the one or more deposition irregularities are identified resulting in the one or more deposition defects in the porous structure.

During manufacturing of the porous structure one or more deposition irregularities may occur which can result in one or more defects in the porous structure. These defects may result in different characteristics or properties of the formed porous structure compared to the characteristics or properties of the to be manufactured porous structure.

The process parameters can be followed up even during the extrusion process, such as to detect at any time whether deposition errors or defects have surfaced during the extrusion process. The deposition errors or defects may be caused by the one or more deposition irregularities causing an irregular rising and/or falling of the pressure value. This may for instance be caused by at least one of a gas or vapor bubble, an air bubble or a nozzle clogging. Advantageously, in this way, the quality of the resulting printed porous structure can be significantly improved.

Optionally, the impact of the one or more weakened zones is estimated during deposition of the filaments for manufacturing the porous structure, and an extrusion parameter is adjusted or the manufacturing is prematurely cancelled based on said estimate of the impact.

The processing unit may adjust one or more extrusion parameters in order to correspondingly compensate for the irregular rising and/or falling of the pressure value. Alternatively, the processing unit may halt the printing process if the printing irregularity is too severe. In this way, the manufacturing efficiency can be significantly improved. It is no longer necessary to complete printing of the porous structure, if it would result in a porous structure having unacceptable characteristics or properties compared to the desired characteristics or properties of the porous structure to be manufactured.

Optionally, the measuring unit includes a load sensor positionable at a build material reservoir, between build material reservoir and nozzle, or at the nozzle, the load sensor being configured to measure data indicative for pressure in the build material reservoir, wherein the processing unit is configured to process data provided by the load sensor.

The load sensor may provide a simple way to obtain the pressure value indicative of the pressure applied on the build material in the build material reservoir for discharging the build material through the nozzle opening. The sensor data from the load sensor can be easily analyzed and processed by the processing unit. In this way, a cost-effective solution can be obtained for monitoring the pressure value.

Optionally, the sensor is a load cell including a transducer arranged for creating an electrical signal whose magnitude is proportional to the force being measured, wherein the load cell is arranged to measure the force applied for discharging the build material out of the nozzle.

A load cell can be easily integrated in the nozzle. The load cell is also robust and can be used for real-time monitoring of the load/pressure applied on the porous structure. Many types of load cells exist and can be used. It is also envisaged that a plurality of load cells are used in the nozzle.

By employing a load cell at the nozzle for receiving data indicative of the pressure value exerted on the build material in the build material reservoir, deposition defects can be identified more easily.

The potential deposition irregularities can be identified as irregular rising and/or falling of the pressure value with respect to a plateau level reached during deposition of the filaments. The invention provides for a way of early compensation such as to compensate for the irregular rising and/or falling of the pressure value. The plateau level may be a pressure range in which the build material is extruded consistently from the nozzle opening. A load cell may be arranged configured to determine which force is applied to the build material (e.g. paste) and how this force changes as a function of time during deposition of the filaments. During initialization of deposition of the filaments, a stabilization time may be required in which the pressure gradually changes. The controller may be arranged to take this into account and wait until a plateau level is reached. The pressure value may substantially stabilize at this plateau level, such that the value remains in a band or range (cf. envelope) during normal deposition. If the pressure value escapes the plateau level due to a sudden peak or sudden drop, this can be identified as an imminent or an effective deposition defect resulting from an erroneous operation of the nozzle. A reservoir can be filled with the build material. This can performed while trying to minimize the amount of air introduced into the reservoir. A nozzle can be selected which is to be used for extruding the build material for deposition of filaments having a certain thickness. A pump may be used for pushing a constant flow out of the nozzle coming from the reservoir.

Different types of pumps can be used, for instance a syringe pump. The syringe pump may include a stepper motor which is configured to run at a constant speed using a spindle for obtaining a substantially constant volume rate discharged from the nozzle opening of the nozzle.

The reservoir may have a same diameter as a normal syringe that would be used on the pump. In this way, the flow rate may be better guaranteed. Inside the reservoir, the paste may be sealed at the top e.g. by a rubber of a plastic syringe, which serves as a piston. This can be driven by the spindle to force the paste through the nozzle opening of the nozzle.

The printing process may be controlled by means of a load cell. During printing, a load cell may be utilized for determining an indication of a force being exerted on the build material in the reservoir. The load cell may be built in between the pump that turns the spindle and the reservoir. It will be appreciated that other arrangements are also possible. The load cell may for example be configured to operate based on a Wheatstone bridge.

Optionally, the measuring unit further includes a flow sensor configured to measure a flow value indicative of a flow of build material extruded through the nozzle outlet, wherein the processing unit is configured to process the flow data for determining one or more flow irregularities formed by an irregular rising and/or falling of the flow with respect to a plateau flow level during deposition.

The flow rate also provides an indication about a deposition quality during printing. Therefore, an improved assessment of deposition defects may be achieved using data provided by the flow sensor.

Optionally, the flow sensor is arranged for performing non-contact flow measurements for determining the flow rate of build material discharged through the nozzle opening of the nozzle. A non-contact flow measurement is particularly especially advantageous as the build material may be a viscous paste which may rather sticky.

Optionally, the flow sensor is a microfluidics flow sensor. Such microfluidic sensor can be able to measure flow rates of a few μl/min.

Optionally, the flow sensor is a laser-doppler vibrometer flow meter.

Optionally, the flow sensor is thermal-based flow meter, wherein the thermal based-flow meter is configured to provide a heat pulse to the build material and detect a temperature of the build material further downstream. Based on the temperature variation a flow rate can be determined.

Optionally, the flow sensor is arranged for determining the flow rate on the basis of a logged balance. In this way, it is possible to determine the flow rate on the basis of the mass density.

Optionally, the final manufactured structure is further characterized by means of a vision system, such as a camera system.

Optionally, the processing unit is configured to control the extrusion unit such as to adjust an extrusion parameter, for example the pressure exerted to the print material, in order to compensate for the irregular rising and/or falling of the pressure value detected by means of the measuring unit. In some examples, in case of a detected irregular rising and/or falling of the pressure value the extrusion unit may be configured to promptly apply more pressure or less pressure on the build material during deposition of the filaments.

The nozzle can be operated to apply more pressure on the build material for discharging the build material through the nozzle opening when a sudden dip/peak is detected. The sudden peak may indicate that the nozzle opening is getting blocked, such that an intervention by applying more pressure may overcome this issue more quickly. In this way, the severity of the defect of the porous structure may be reduced. In case of a sudden dip or drop in the pressure value, the pressure may be increased in order to more quickly release the air pressure within the build material.

A feedback loop may be provided in order to control the pressure in function of the measured pressure value. An immediate action can be taken for controlling the operational parameters of the porous structure for adjusting the pressure applied on the build material, when a deposition irregularity is detected.

Optionally, the plateau level has a baseline envelope forming a channel with an upper limit and a lower limit, wherein the irregular rising and/or falling of the pressure value with respect to the plateau level is identified when the pressure value breaks out of the baseline envelope of the plateau level.

The pressure value indicative of the pressure applied on the build material in the build material reservoir is monitored over time. An irregular rising and/or falling of the pressure value can be identified if the actual measured value falls outside the baseline envelope of the plateau level during deposition.

Optionally, the method further includes performing an evaluation of a quality of the extrusion manufactured porous structure, wherein the quality is based on a number and/or severity of compensating actions following identified deposition defects.

An overall quality of the porous structure may be objectively quantified based on detected compensating actions and/or defects in the porous structure, which are determined by the processing unit which processes the data obtained during deposition of the filaments in order to identify patterns therein linked to extrusion irregularities. The pattern can be identified based on or more fluctuations formed by spikes or dips the in the pressure value with respect to the plateau level (which can be a range or band).

Optionally, the controller takes into account a stabilization time required for the pressure to fully build up and stabilize at a plateau level. The stabilization time may depend on material properties of the build material.

It will be appreciated that a fluctuation can be considered as an irregular rising or falling in a significant amount with respect to a plateau level. A significant amount of change with respect to a baseline of the plateau level may for instance be larger than 10%, larger than 15%, larger than 20%, larger than 30%.

Optionally, in the pressure value data the ratio between the (negative or positive) peak at the irregular rising/falling and the plateau level is larger than 1.2, more preferably larger than 1.2, even more preferably larger than 1.3.

Optionally, the processing unit is configured to identify deposition defects in real-time by analyzing pressure value data. In an example, the pressure value data may be measured and analyzed in real-time. By means of the analysis of the pressure value, defects of the porous structure resulting from irregular deposition can be determined accurately and be compensated. The pressure value can be measured, monitored, processed in real-time during deposition of the filaments. In an embodiment, the pressure value can be adjusted in real-time during deposition of the filaments.

Optionally, the processing unit is configured to perform peak detection (positive or negative) for identifying deposition irregularities in the measured pressure value data and for adjusting an extrusion parameter. It may also be possible that a peak detection algorithm is employed which identifies both (local) maximum and minimum pressure value data positions.

According to an aspect, the invention provides for an additive manufacturing system for manufacturing a three-dimensional porous structure, the system comprising: an extrusion unit including a nozzle with a nozzle outlet and a build material reservoir, the build material reservoir being in fluid communication with said nozzle outlet, the build material comprising particles of inorganic material dispersed in a binder and at least one solvent; an extrusion unit configured for depositing filaments of the build material in a predetermined interconnected arrangement in a plurality of stacked layers for forming the three-dimensional porous structure with interconnected pores; a measuring unit configured for monitoring a pressure value indicative of a pressure being applied on the build material in the build material reservoir during extrusion of the build material through the nozzle to achieve deposition of the filaments; and a processing unit configured for processing the monitored pressure value for detecting one or more deposition irregularities by identifying an irregular rising and/or falling of the pressure value with respect to the plateau level reached during extrusion, wherein during the irregular rising the pressure value momentary spikes before it returns to its plateau level, wherein during the irregular falling the pressure value momentary drops before it returns to its plateau level, and wherein the processing unit is configured to adjust at least one extrusion parameter in order to compensate for the irregular rising and/or falling of the pressure value. Optionally, the processing unit is configured to adjust an extrusion parameter in order to compensate for the irregular rising and/or falling of the pressure value and to link the one or more identified deposition irregularities to a risk to the occurrence to one or more deposition defects in the porous structure.

The invention enables the (early) detection of possible future errors which would occur if not acted upon. Instead of post-detecting already occurred errors, the invention can compensate for irregularities in the pressure value such as to avoid severe printing errors as much as possible. By monitoring the pressure value, it is possible to detect future printing irregularities before they have occurred (enabling compensation therefor). The invention provides a way to not only detect problems at an early stage but also to compensate, prevent or minimize them in an early stage while filament deposition is going on, in such a way that errors upon extrusion may be prevented or minimized. The present invention permits adjusting one or more deposition parameters while the build material is travelling towards and through the nozzle, so that problems with build material travelling through the nozzle and/or being extruded from the nozzle can be compensated to a desired extent or even be prevented in advance of filament deposition from the nozzle.

The system according to the invention can be easier to apply, more accurate, provide better identifications of deposition defects, more cost-effective, etc. with regard to known systems.

The pressure value can be monitored for detecting sudden fluctuations escaping a certain plateau level (e.g. range or band). These sudden fluctuations can be identified based on one or more peaks and/or troughs in the pressure data, which can be linked to extrusion irregularities and thus a defect in the porous structure being manufactured.

The extrusion conditions can be analyzed during deposition of the filaments in order to detect one or more deposition defects when the porous structure is being formed. The printing process can thus be processed in real-time by processing pressure values monitored during filament deposition. During deposition the pressure value may be at a plateau level. Sudden positive peaks or negative peaks (trough in graph) breaking out of the plateau level may indicate a deposition irregularity and a need for adjusting an extrusion parameter in order to compensate for the breaking out The plateau level can be a range (cf. band/channel/envelope) with a baseline and an upper limit and a lower limit. The deposition irregularity can be identified at the moment the pressure value suddenly breaks out of the range of the plateau level. The pressure value may have positive and/or negative peaks falling within the plateau level, which are not identified as deposition irregularities, and positive and/or negative peaks breaking out of the plateau level, which are identified as deposition irregularities.

The pressure value data may be collected for the entire period during which the filaments are deposited. Optionally, a predefined interval is definable by a user.

According to an aspect, the invention provides for a computer program product configured for performing, when run on a controller, the steps of the method according to the invention.

The computer program product may provide a quality or structural integrity monitoring tool by providing immediate feedback during deposition of the filaments when the porous structure is manufactured. In an example, the computer program product is run on the processing unit.

Pressure value data (or data indicative thereof, for instance coming from a force) may be collected by means of the measuring unit. The collected pressure value data may be stored in a memory. The processing unit receives the collected pressure value data for performing specific data analysis. The data analysis may for instance involve recognition of certain events or patterns in the data. The event may be specifically linked to a deposition defect. Advantageously, the invention provides a way to determine the specific cause of manufacturing defects in the porous structure by detecting sudden fluctuations in the pressure value data.

Erroneous data points may be automatically identified and eliminated. For instance, outliers and/or outliners can be automatically discarded. In an example, a curve fitting algorithm is employed for identifying relevant data points.

The processing unit may be configured to perform peak characterization for determining the effect of the pressure value fluctuation on the deposition. The irregular rising and/or falling may be a local maximum or local minimum with respect to a baseline of the plateau level.

The pressure value data may be collected at a predefined time interval during deposition of the filaments when manufacturing the porous structure. The predefined time interval may include for instance a user define time period. It is also envisaged that pressure value data is collected until one or more events or patterns (e.g. fluctuations) are recognized by the processing unit.

The method may further include generating an output data including a representation (e.g. summary) of a type of the identified defect (e.g. structural weakness), an affected part of the porous structure, a severity of the defect, etc. A type of deposition defect may for instance include a reduced filament diameter, a deformed filament, a discontinuous deposition of filament, etc.

According to an aspect, the invention provides for a system for manufacturing a porous structure, the system including: an extrusion unit including a nozzle with a nozzle outlet and a build material reservoir in fluid communication with said nozzle outlet, wherein the extrusion unit is arranged for depositing, through the nozzle outlet, filaments in a predetermined interconnected arrangement in a plurality of stacked layers for forming a porous structure with interconnected pores, a measuring unit including at least one sensor for monitoring, during discharge of the filaments by the extrusion unit, a pressure value applied on the build material in the build material reservoir of the nozzle for discharging said build material through the nozzle outlet, and a processing unit configured to process the monitored pressure value for identifying an irregular rising and/or falling of the pressure value with respect to a plateau level of the pressure value reached during discharge, wherein the processing unit is also configured to control the extrusion unit such as to adjust an extrusion parameter in order to compensate for the irregular rising and/or falling of the pressure value, wherein during an irregular rising the pressure value momentary spikes, wherein during an irregular falling the pressure value momentary drops.

The sensor may take several positions in the build material reservoir, but additional sensors may be provided, for example at the nozzle, or at any other suitable position. In some examples, the sensor is at least directly on indirectly coupled to the nozzle and/or build material reservoir such as to monitor the pressure value indicative of the pressure being applied on the build material in the build material reservoir during extrusion of the build material through the nozzle to achieve deposition of the filaments.

It will be appreciated that the pressure value may be a quantity indicative for the pressure value or load (e.g. force) applied on the build material within the build material reservoir of the nozzle.

The pressure value may be related to the extrusion flow or deposition rate. It will be appreciated that other deposition related values, parameters and/or quantities may also be monitored. Deposition irregularities may be detected using at least one of a load sensor (e.g. load cell), a flow meter or an imaging system. By monitoring the deposition related quantities, a quality of the deposition can be evaluated.

According to an aspect, the invention provides for a method of evaluating a quality of an extrusion manufactured structure.

According to an aspect, the invention provides for a method of detecting defects in the porous structure being manufactured.

According to an aspect, the invention provides for a method of evaluating a structural integrity of an extrusion manufactured porous structure.

According to an aspect, the invention provides for a method of analyzing an extrusion of a porous structure.

According to an aspect, the invention provides for a method for evaluating a quality of an extrusion manufactured structure, the method including: providing a measuring unit including at least one sensor for measuring data indicative for a deposition rate, and processing by means of a processing unit the data obtained during deposition of the filaments in order to identify a pattern linked to an extrusion irregularity, wherein the pattern is identified based on sudden peaks and/or troughs in the data.

According to an aspect, the invention provides for a computer program product configured to receive data from a measuring unit, wherein the computer program product is configured to identify a pattern linked to a extrusion irregularity in the data, wherein the pattern is identified based on sudden peaks and/or troughs in the data and sudden peaks and/or troughs in the data that have been compensated for.

According to an aspect, the invention further provides for a use of the system according to the claims for evaluating a quality of an extrusion manufactured structure.

Different types of extrusion additive manufacturing arrangements can be employed, for example filament-fed extrusion, screw extrusion or a syringe extrusion of a viscous dispersion or a viscous paste. A combination of these technologies is also possible.

The additive manufacturing method of this invention may also be referred to as 3D printing, 3DFD, fibre deposition, filament deposition, robocasting, micro-extrusion etc., or a combination of two or more of these.

In syringe extruders material can be placed into a syringe and the printer can depress the plunger at a controlled rate to extrude filaments through a nozzle. The syringes may for example be filled with a viscous material. In some examples, additionally a heated jacket can be used for heating the syringe to melt the material (e.g. polymer granules) in situ before printing. Different types of syringe extrusion systems are possible. A pneumatic pressure can be applied to the plunger. Alternatively, the plunger can be depressed by means of a mechanical displacement for instance achieved by means of an electric motor. Mechanical displacement may allow for more direct control over the volumetric extrusion rate whereas in pneumatic printers, the extrusion rate may additionally depend on an interplay between needle geometry, material viscosity, pneumatic pressure, and obstruction by previously extruded filaments. Other alternative designs are also possible.

In screw extruders a material can be fed into a screw that is surrounded by a close-fitting sleeve, called a barrel. As the screw rotates, molten polymer can be forced through the nozzle at the end of the barrel. The rate of material extrusion from the nozzle can depend on the screw rotation speed. Screw extruders can accommodate materials in paste form, however, for example polymer granules can also be used.

It will be appreciated that any of the aspects, features and options described in view of the method apply equally to the system and the described computer program product and three-dimensional porous structure. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

FIG. 1 shows a schematic diagram of a print path in an extrusion process for manufacturing a three-dimensional porous structure 1. The print path illustrates how the filaments of the porous structure are deposited on the plurality of layers. The method includes depositing interconnected filaments in a predetermined arrangement in a plurality of stacked layers. The filaments of the consecutive layers are connected to one another to obtain the porous structure with interconnected pores. Furthermore, filaments of the consecutive layers are angled with respect to each other.

In this example, filaments with one or more frangible regions are obtained by following a specific print path. The predetermined arrangement of interconnected filaments are configured such that the porous structure has the desired level of porosity.

In the extrusion process, a nozzle 1 is scanned along a print bed 3 depositing filaments following the shown print path 5. It will be appreciated that it is also envisaged that the print bed 3 is moved instead of the nozzle 1 (kinematic inversion). A combination is also possible. In an alternative example, both the nozzle 1 and the print bed 3 can be moved during at least portions of the deposition process.

Figure 1A:
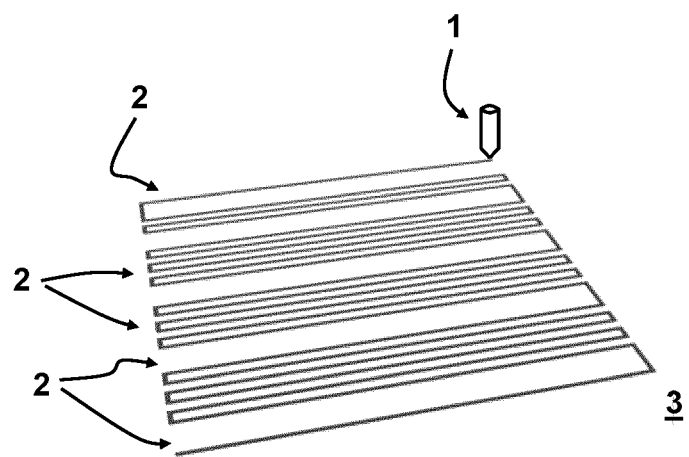
FIG. 1 shows a schematic diagram of an extrusion process.
Figure 1B:
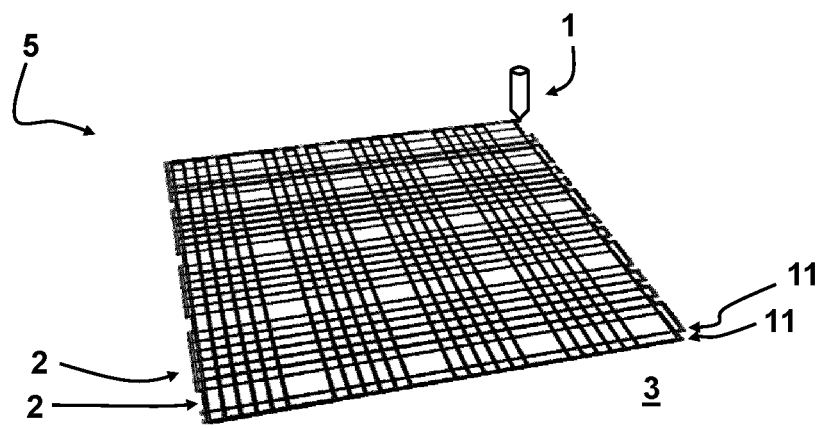
Figure 1C:
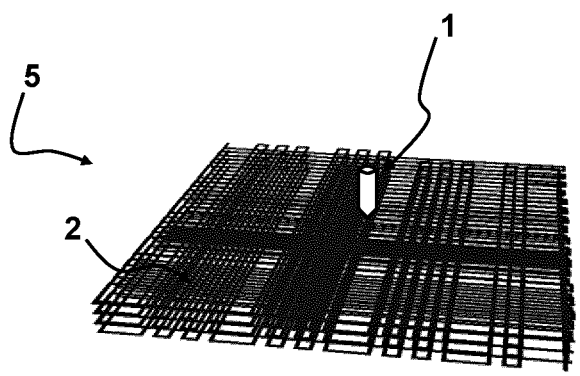

In FIG. 1a, the print path 5 for the first layer on the print bed 3 is shown. In FIG. 1b, the print path 5 of the two layers are shown. In FIG. 1c, the print path 5 is shown in which the fourth layer has not been finished yet. It will be appreciated that large variety of print path arrangement are possible for defining the one or more frangible regions in the porous structure to be manufactured.

By altering the deposition pattern, the local mechanical properties of the porous structure are locally changed. In this example, the porous structure being printed has a non-homogeneous filament-to-filament distance (interspacing).

If a nozzle goes into error (blockage, more paste deposition, . . . ) the structural integrity of the porous structure can be affected. The deposition irregularity may for example be the result of air voids within the build material being deposited through the nozzle opening of the nozzle.

The pressure value data may be collected during a period of deposition of filaments, i.e. during extrusion based manufacturing of the porous structure. The system enables predicting the occurrence of defects and/or malformations in the porous structure by objective quantification of pressure values during deposition of the filaments. The measuring unit can be arranged to communicate pressure value data wirelessly to the processing unit, for instance arranged at a remote location. The remote location may include one or more processing units. Optionally, the measuring unit communicates the pressure value data wirelessly to a server (e.g. in the cloud) acting as the processing unit (for performing analysis of the data). Historical data may also be saved on the remote server, accessible by means of e.g. a mobile phone. It will be appreciated that other devices can also be used instead of the mobile phone, such as for example a computer, a laptop, a handheld device, a tablet, etc. It is also possible that signal processing units are integrated in the measuring unit. The processing unit may be configured to build or save a historical database. Knowledge about prior and present deposition defects can have significant value for preventing future deposition defects. Furthermore, it can be prevented that a deposition defect is noticed too late.

The method of the present invention may involve measurement of the pressure value by means of a first measuring unit for measuring a first pressure value indicative of a pressure being applied on the build material in the build material reservoir, and at least a second pressure value by means of at least one second measuring unit positioned at a different location. The method of this invention further comprises determining/calculating a difference between the first and at least one second pressure value and adjusting an extrusion parameter depending on the difference.

Advantageously, possible deposition irregularities can be even better compensated for in this way. It will be appreciated that the pressure value may be measured at even more locations in the build material reservoir, for instance using a further measuring unit.

The processing unit can be arranged to collect the pressure value data for a total time interval during deposition of the filaments. Optionally, pressure value data for unrestricted time intervals are collected during deposition, for instance depending on the total time of deposition of the filaments.

The processing unit can be arranged to collect the pressure value determined by means of a first measuring unit for measuring a first pressure value indicative of a pressure being applied on the build material in the build material reservoir, at least a second pressure value by means of at least one second measuring unit positioned at a different location, for calculating a difference between the first and at least one second pressure value and adjusting an extrusion parameter depending on the difference.

The system also enables adjusting one or more printing parameters in the course of the printing process, preferably following quantification of pressure values during deposition of the filaments with the purpose of compensating the pressure value and minimize the occurrence of defects and/or malformations in the porous structure.

Figure 2A:
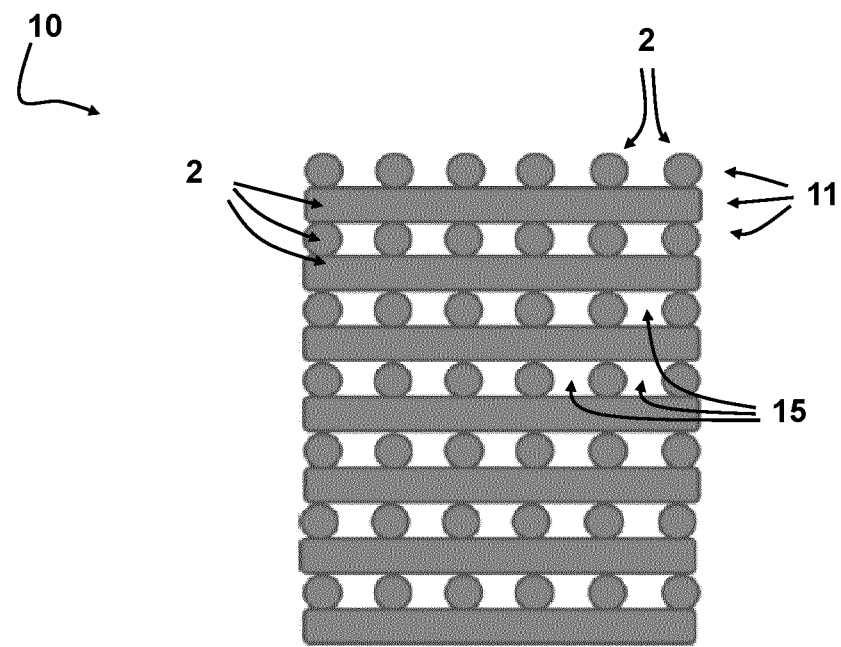
FIG. 2 shows a schematic diagram of an embodiment of a porous structure.
Figure 2B:
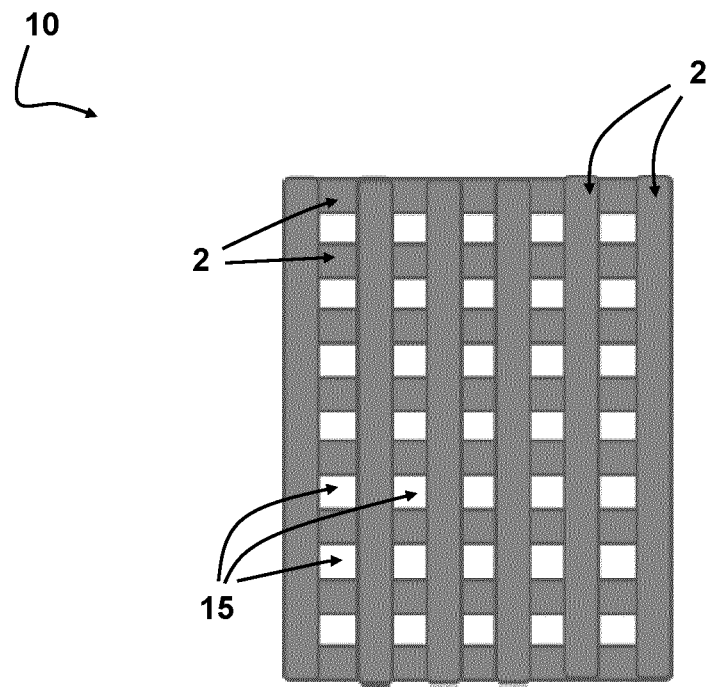

FIG. 2 shows a schematic diagram of an embodiment of a porous structure 10. FIG. 2a shows a cross sectional side view and FIG. 2b shows a cross sectional top view. The porous structure 10 can be obtained by means of an extrusion unit comprising a nozzle with a nozzle outlet and a build material reservoir. The build material reservoir is in fluid communication with said nozzle outlet. An extrusion unit can be utilized for depositing filaments 2 in a predetermined interconnected arrangement in a plurality of stacked layers 11 for forming a porous structure 10 with interconnected pores 15.

The measuring unit may include one or more devices arranged for measuring a quantity indicative of a pressure or load applied on the build material in the build material reservoir of the nozzle for discharging the build material through the nozzle opening. Different types of devices or sensors can be used for this purpose. The measuring unit can be used for structural monitoring the extrusion quality during deposition of the filaments. In an advantageous way, the pressure value can be monitored for determining structural integrity problems resulting from deposition defects by processing monitored data with a processing unit.

The processing unit may be configured to perform data analysis. The processing unit may load or receive one or more pressure value data from one or more sensors of the measuring unit. The processing unit may be configured to perform data analysis algorithms, wherein the results are optionally provided to reporting means (e.g. on a computer, laptop, smartphone, tablet, cloud, network, etc.).

The processing unit may also be configured to adjust one or more printing parameters in the course of the printing process, preferably following quantification of pressure values during deposition of the filaments to minimize the risk to the occurrence of defects and/or malformations in the porous structure by objective.

Figure 3:
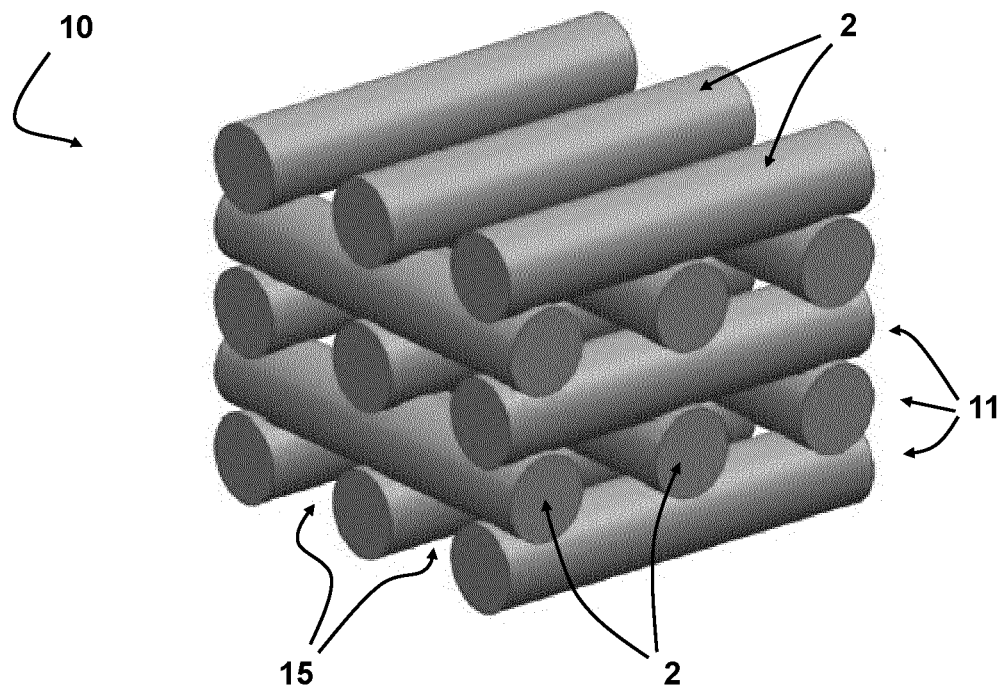
FIG. 3 shows a perspective view of a schematic diagram of an embodiment of a porous structure.

FIG. 3 shows a perspective view of a schematic diagram of an embodiment of a porous structure 10. During manufacturing of the porous structure 10, a measuring unit can be employed for monitoring a pressure value indicative of a pressure being applied on the build material in the build material reservoir of the nozzle during deposition of the filaments. In this way, it can be guaranteed that the porous structure does not include deposition defects. Hence, a quality or structural integrity of the porous structure can be assured when no deposition defects are identified during manufacturing of the porous structure 10.

It will be appreciated that the pressure value may provide an indication of the pressure in the build material reservoir of the nozzle. The pressure value can also be considered as a force value or an extrusion force value, which can be seen as a mechanical load applied on the porous structure for enabling discharge of the build material (e.g. paste) through the nozzle opening. Various sensors can be used for registering the extrusion force/pressure applied on the build material. Additionally or alternatively, a flow rate of build material discharged through the nozzle opening is monitored.

The processing unit can be configured to monitor one or more process parameters (e.g. extrusion force, extrusion pressure, flow rate, etc.) of the extrusion process for identifying one or more deposition defects in the printed porous structure. Advantageously, by means of the invention, it can be known how the porous structure 10 is formed even internally. This insight can be obtained without the need of destructive methods, e.g. slice the porous structure 10 in pieces.

It will be appreciated that the porous structures 10 can be used for various applications. Some exemplary applications are catalytic combustion of substances, environmental catalysis, heat exchanger, medical implants, etc. Advantageously, the production process of the porous structure can be monitored for analyzing the porous structure made during the process. In this way, a structural integrity which can be desired to specific applications can be better guaranteed.

Figure 4A:
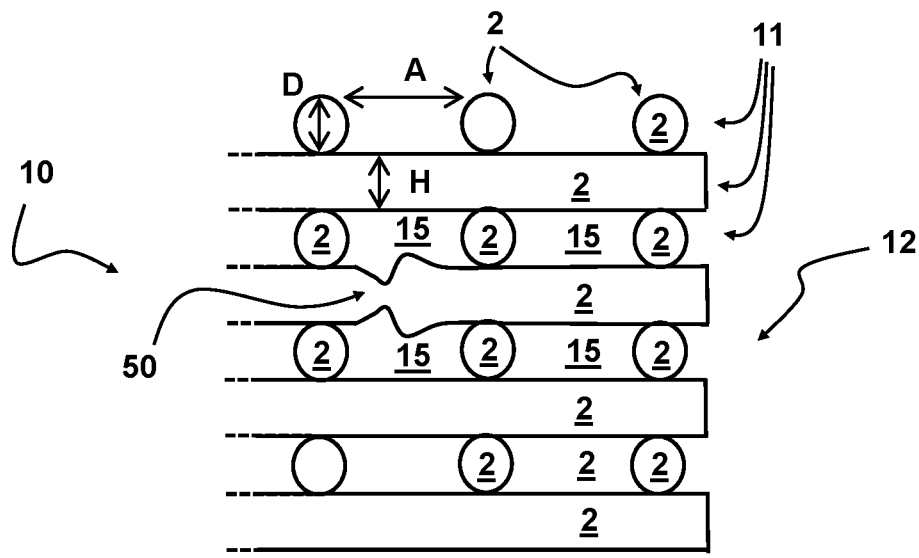
FIG. 4 shows a schematic diagram of embodiments of a porous structure.
Figure 4B:
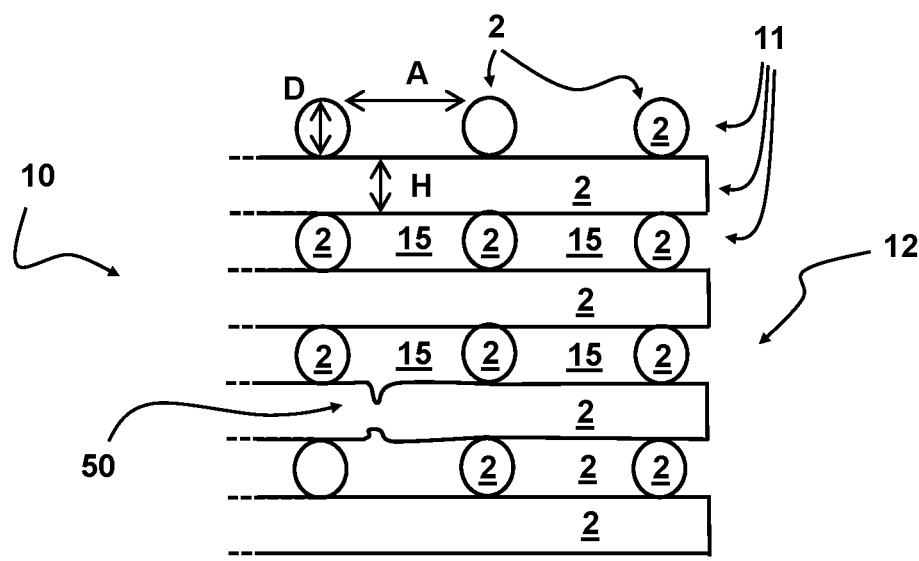

FIG. 4 shows a cross sectional side view of a schematic diagram of embodiments of a porous structure 10 with a plurality of layers 11 of deposited filaments 2 stacked on each other. The filaments 2 have a filament diameter D and a filament-to-filament distance A. A layer may have a height H. This height may correspond substantially to the filament diameter D. However, variations are also possible. For instance a height H may be reduced at the one or more frangible regions.

A build material can be extruded in the form of a first layer, the first layer including a plurality of filaments 2. The filaments 2 may for instance be part of an elongated strand of deposited build material. In an example, the elongated strand is deposited continuously. However, non-continuous deposition of filaments is also possible. Furthermore, one or more additional layers can be extruded, each additional layer being vertically stacked upon a previously extruded layer and also comprising a plurality of filaments 2 angled with respect to a number of filaments 2 of the previous layer. A predetermined pattern is dispensed so as to define the three-dimensional structure/object being manufactured.

The porous structure 10 has pores 15 which are interconnected such that mass transfer for a wide range of applications can be ensured. The geometry and arrangement of the filaments 2 affect the porosity and the mechanical properties of the porous structure. The position and orientation of filaments 2 in the filament arrangement, i.e. lay-down pattern obtained by deposition along the print path, may be adapted depending on the desired structural characteristics of the porous structure being manufactured. The filament-to-filament distance A (interspace) may for instance be adapted. The mechanical properties can be affected by the relative orientation of filaments 2 across multiple layers 11.

The 3D extrusion printing process is monitored and analyzed for detecting one or more deposition errors during deposition of the filaments. Deposition errors can influence some structural parameters such as fiber thickness and interfiber distance of the manufactured porous structure. In this way, the overall structural integrity of the porous structure may be compromised.

The pressure value can be monitored during deposition of the filaments. The monitored pressure value can be analyzed for detecting one or more deposition irregularities in the formed porous structure by identifying an irregular rising and/or falling of the pressure value with respect to a plateau level reached during deposition. The one or more identified deposition irregularities can then be linked to one or more deposition defects 50 in the porous structure 10. The porous structures depicted in FIGS. 4A and 4B have different deposition defects 50, having a different severity. The severity can be estimated based on the monitored pressure value in order to determine the impact on the quality and/or structural integrity of the manufactured porous structure.

The measured pressure value data can be used for analyzing at least the magnitude of the peaks in pressure value and correlate specific patterns (i.e. pattern in changes in pressure value time data) with a type of defect and/or disorder of the manufactured porous structure. One or more pressure value profiles may be obtained from the pressure value data. The system provides an accurate evaluation, which would be difficult to anticipate based on visual inspection. Visual inspection may not provide an easy way to accurately assess deposition defects.

The diameter of the extruded fibers and the distance between two adjacent fibers can be determined or estimated on the basis of the monitored pressure value for determining whether one or more deposition defects are present in the formed porous structure.

Figure 5:
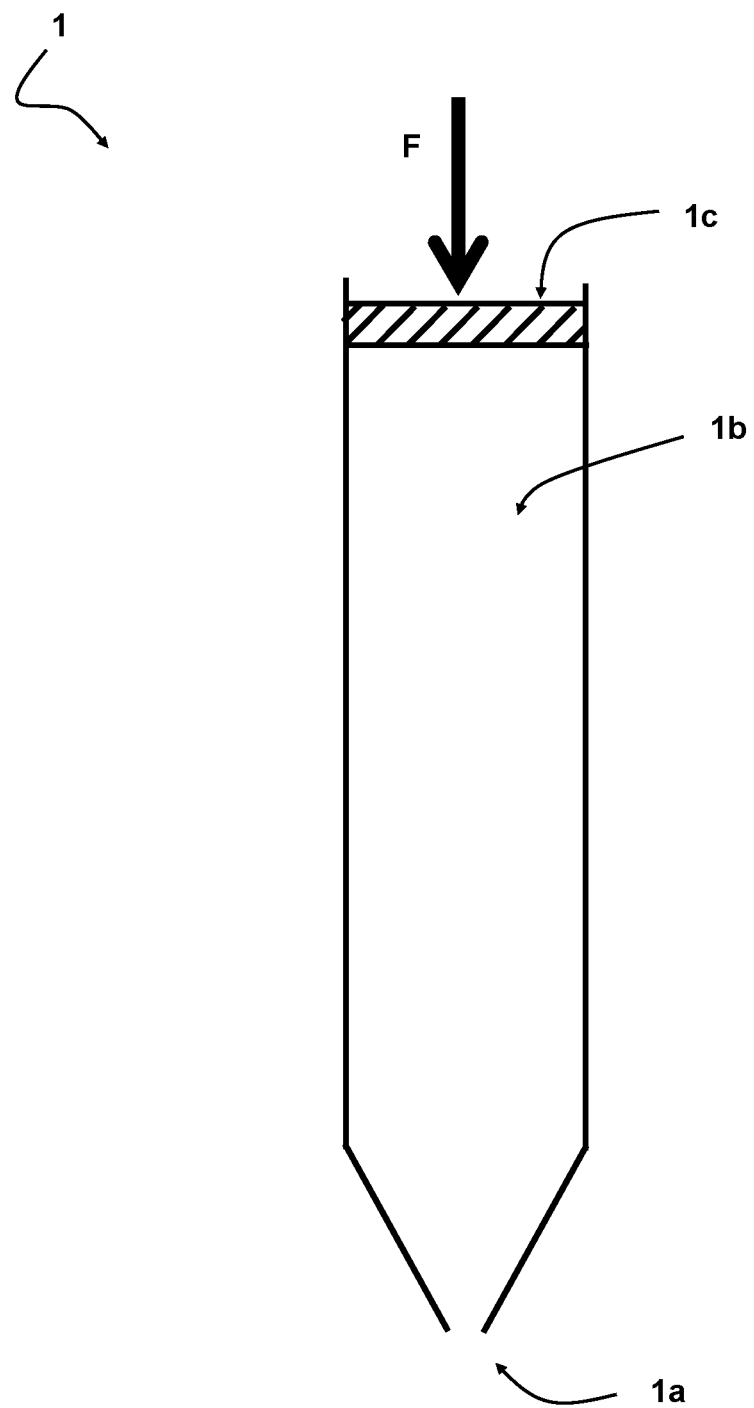
FIG. 5 shows a schematic diagram of an embodiment of a nozzle.

FIG. 5 shows a cross sectional side view of a schematic diagram of an embodiment of a nozzle 1. The nozzle includes a nozzle opening 1a and a build material reservoir 1b. The nozzle 1 includes actuation means 1c for exerting a force/pressure on the build material within the build material reservoir 1b. As a result of this load, the build material can be discharged through the nozzle opening 1a. The nozzle 1 includes a measuring unit arranged for monitoring, a pressure value indicative of a pressure being applied on the build material in the build material reservoir 1b of the nozzle 1 during deposition of the filaments 2. Different types of measuring units can be employed.

In this example, the measuring unit includes a load sensor positionable at a build material reservoir, the load sensor being configured to measure data indicative for pressure in the build material reservoir, wherein the processing unit is configured to process data provided by the load sensor. More particularly, the sensor is a load cell including a transducer arranged for creating an electrical signal whose magnitude is proportional to the force being measured, wherein the load cell is arranged to measure the force applied for discharging the build material out of the nozzle 1. The load sensor may for instance be arranged at the actuation means 1*c*. Advantageously, a simple design is obtained providing an accurate indication of the pressure applied on the build material in the reservoir 1*b* of the nozzle 1.

The pressure value can be determined using force sensors, with high sensitivity. The measuring unit may provide accurate feedback of the exerted pressure/force during deposition of the filaments for manufacturing the porous structure.

Figure 6:
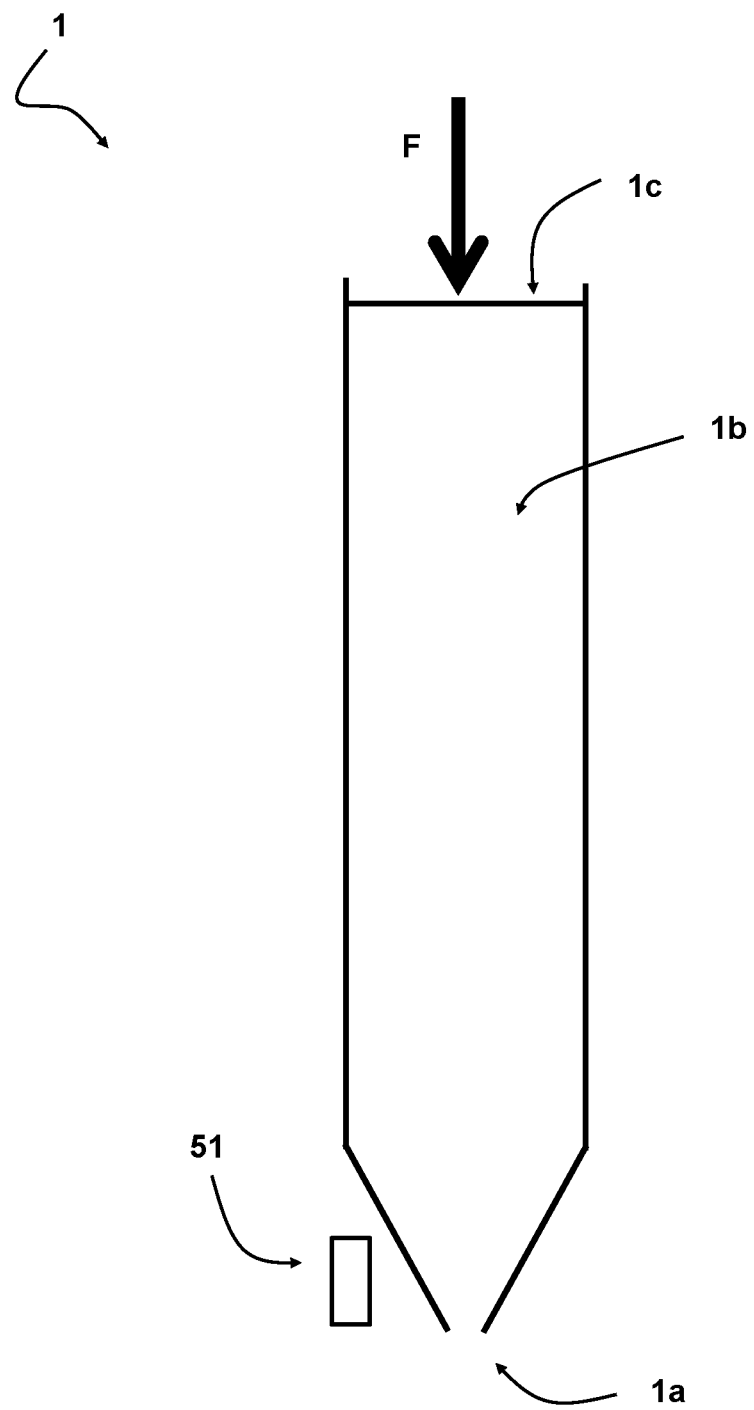
FIG. 6 shows a schematic diagram of an embodiment of a nozzle.

FIG. 6 shows a cross sectional side view of a schematic diagram of an embodiment of a nozzle 1. A sensor such as a force or pressure transducer can be arranged for measuring a force/pressure applied on the build material during deposition of filaments. The force/pressure value sensor of the measuring unit can be detachable with respect to the nozzle. It is also possible that the pressure sensor is integrated with the nozzle. The pressure value sensor (e.g. load cell) can be sufficiently compact such as to avoid interference with normal movements or functions of the nozzle.

In this example, the measuring unit further includes a flow sensor 51 configured to measure a flow value indicative of a flow of build material extruded through the nozzle outlet 1*a*. The processing unit is configured to process the flow data for determining one or more flow irregularities formed by an irregular rising and/or falling of the flow with respect to a plateau flow level during deposition.

Different types of flow sensors 51 can be used. For example, flow measurements may be carried out based on a thermal pulse. Such technique may be more appropriate for use with highly viscous build materials. Additionally or alternatively, an indication of the flow rate may be obtained by means of weight measurements. For example, the weight can be measured as a function of time via a logged balance. On the basis of a mass which is logged over a certain period and a mass density of the paste that is determined, the flow rate being discharged from the nozzle opening can be identified. Additionally or alternatively, the flow is measured by means of a contactless system for example including at least one of a laser or camera. For example a profilometer can be employed which works on the basis of interference. The dimensions of the extruded filaments can be determined on the basis of which the volume and thus flow rate can be determined. It will be appreciated that other techniques may also be used.

Figure 7:
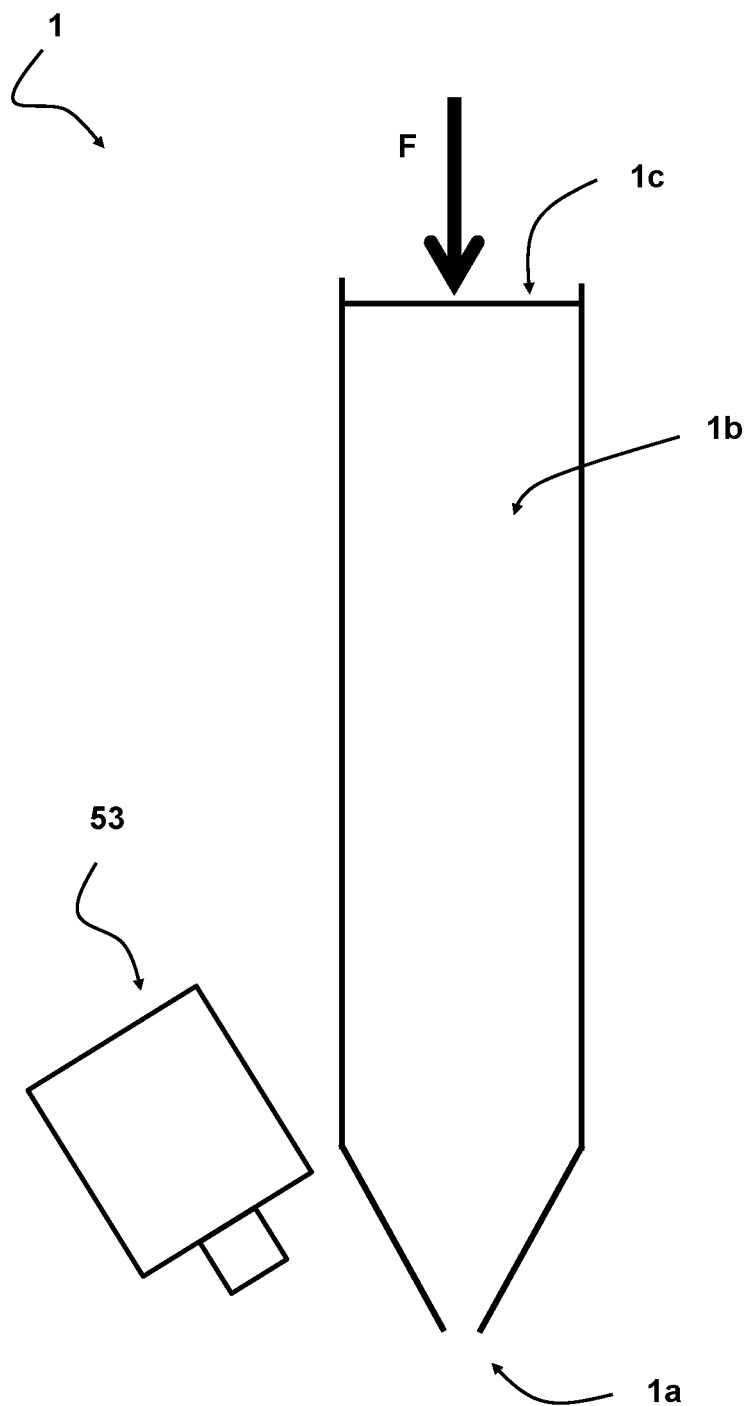
FIG. 7 shows a schematic diagram of an embodiment of a nozzle.

FIG. 7 shows a cross sectional side view of a schematic diagram of an embodiment of a nozzle 1. In this example, the measuring unit further includes an imaging means 53 configured to image the filaments which are deposited through the nozzle opening 1*a* of the nozzle. The imaging means may include at least one of a camera or a laser imaging means.

Figure 8A:
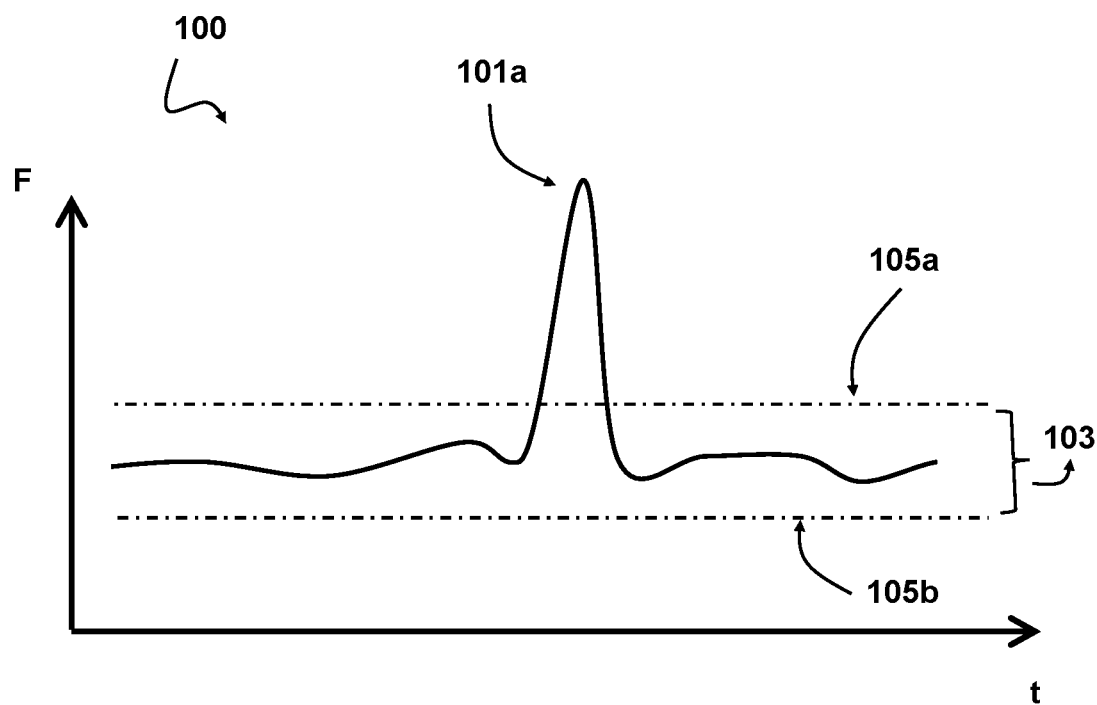
FIG. 8 shows a graph of a monitored value.
Figure 8B:
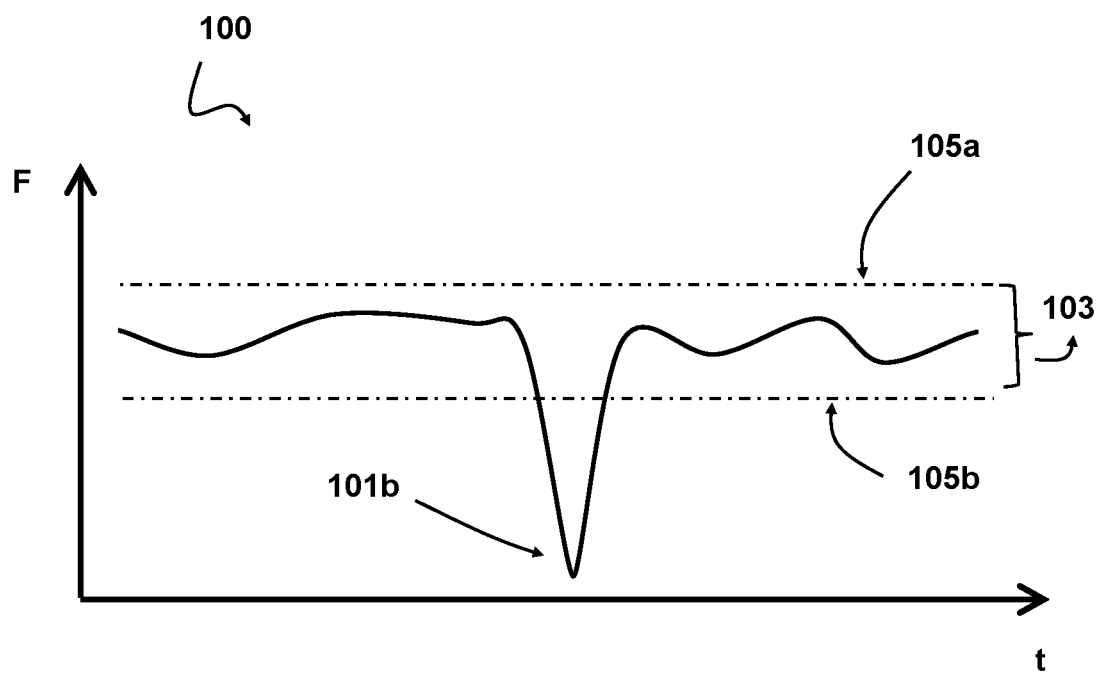

FIG. 8 shows a graph 100 of a monitored value indicative of a pressure applied to the build material in the build material reservoir of the nozzle. The force used for building up a pressure in the build material reservoir for extruding the filament through the nozzle opening is plotted in function of time. The monitored force is thus indicative for the pressure value applied on the build material. A time domain analysis can be employed on the pressure value data. The processing unit is configured to process the monitored time force/pressure values for detecting one or more deposition irregularities in the formed porous structure by identifying an irregular rising 101*a* and/or falling 101*b* of the pressure value with respect to a plateau level 103 reached during deposition. During the irregular rising, the pressure value (cf. force F) momentary spikes before it returns to its plateau level 103. During the irregular falling, the pressure value (cf. force F) momentary drops before it returns to its plateau level 103. The processing unit is configured to link the one or more identified deposition irregularities to one or more deposition defects in the porous structure 10. The processing unit is further configured to adjust a deposition parameter to compensate for the irregular rising or falling of the pressure value.

In this example, the plateau level 103 is a range with an upper limit 105*a* and a lower limit 105*b*. The deposition irregularity can be identified at the moment the pressure value suddenly breaks out of the plateau level range 103. The pressure value may have positive and/or negative peaks falling within the plateau level 103, which are not identified as deposition irregularities, and positive and/or negative peaks breaking out of the plateau level 103 (cf. range or envelope), which are identified as deposition irregularities by the processing unit. The processing unit is further configured to adjust a deposition parameter so that the positive and/or negative peaks breaking out of the plateau level are prevented and deposition irregularities are prevented.

The plateau level 103 may be a region in which the pressure value has stagnated over time. During such plateau phase, the pressure may remain relatively even remaining near a baseline of the plateau level.

The pressure value can remains substantially unchanged within a certain range or bandwidth. The range may have an upper limit and lower limit at +20% and −20% from the baseline of the plateau level, more preferably at +10% and −10% of the plateau level, even more preferably at +5% and −5% from the baseline of the plateau level.

It will be appreciated that evaluation of an deposition of filaments may involve the detection and/or identification of deposition irregularities determined using monitored pressure values during filament deposition. For instance, structural weak spots or other structural integrity conditions of the porous structure can be determined.

The graphs of values indicative of the pressure/force may provide a visual indication of the irregular rising and/or falling of the pressure value with respect to the plateau level reached during deposition. However, the analysis may also be performed numerically without the visual representation. It will be appreciated that small deviations in the pressure value may occur, although still falling within the plateau level (cf. range, band or envelope).

The invention enables an improved characterization of the manufactured porous structures by employing process monitoring using a value indicative of a pressure or force applied on the build material in the nozzle for enabling deposition of the filaments. Advantageously, a quality can be checked or monitored even during printing of the porous structure.

Examples of deposition parameters that may be adjusted in the course of the printing process to compensate for an irregular rising or falling of the pressure value include without being limited thereto adjusting, i.e. increasing or reducing, the pressure exerted to the print material for example in the print build material reservoir or in the nozzle or at any position of the print material feed line before the print material leaves the nozzle; adjusting the viscosity of the print material, for example by heating or cooling the print material, by adjusting the amount of solvent contained in the print material, by supplying a release agent, in the reservoir, the nozzle or any position of the print material feed line before the print material leaves the nozzle; adjusting the print material flow rate, subjecting the print material to vibration; adjusting the nozzle opening, etc., The adjustments may be variable in function of time (e.g. momentarily/temporarily adjusting an extrusion parameter). To allow for an early compensation of an irregular rising or falling of the pressure value, the measuring unit may include a load sensor positionable at a build material reservoir, between build material reservoir and nozzle, or at the nozzle.

Figure 9:
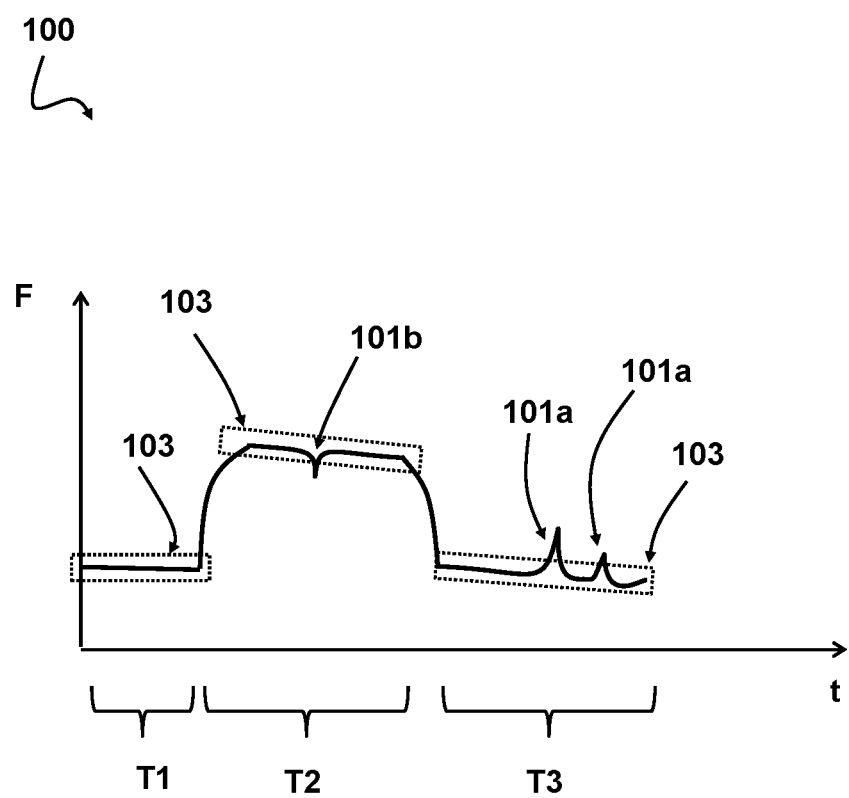
FIG. 9 shows a graph of a monitored value.

FIG. 9 shows a graph 100 of a monitored value indicative of a pressure applied to the build material in the build material reservoir of the nozzle for discharging build material through the nozzle opening. In this example, the force applied by means of an actuation means for pushing the build material out of the build material reservoir is plotted in function of time. This force can represent or at least be indicative of the pressure value indicative of the pressure applied on the build material in the build material reservoir of the nozzle during deposition of the filaments.

The peak/dip height and/or width in the monitored data can be indicative of the severity of the deposition irregularity. The pressure value may be monitored in function of time data and/or position data. As a result, a sudden change pattern (cf. fluctuation) resulting in a deposition defect can be linked to a specific location of the porous structure.

In the shown graph 100, three time intervals can be identified, namely T1, T2 and T3, each having a different plateau level 103. This can for instance be a result of different deposition parameters. In the first time interval T1, the plateau level is a range running substantially straight. No force spikes/dips are present which escape the plateau level 103 in the first time interval T1. In the second time interval T2, the plateau level 103 is slightly sloped. One dip 101b is present which escapes the plateau level range 103. The processing unit is arranged to identify this peak as a deposition irregularity. In the third time interval T3, the plateau level 103 runs almost horizontally. Two peaks 101a are present which escape the plateau level range 103. The processing unit is arranged to identify these peaks as deposition irregularities linked to deposition defects and to adjust a deposition parameter to counteract these peaks as soon as the peaks escape the plateau level 103 range. Furthermore, the processing unit can determine a severity of the deposition defect at least based on an amplitude and/or shape of the irregular rising and/or falling of the force with respect to the plateau level 103.

Figure 10:
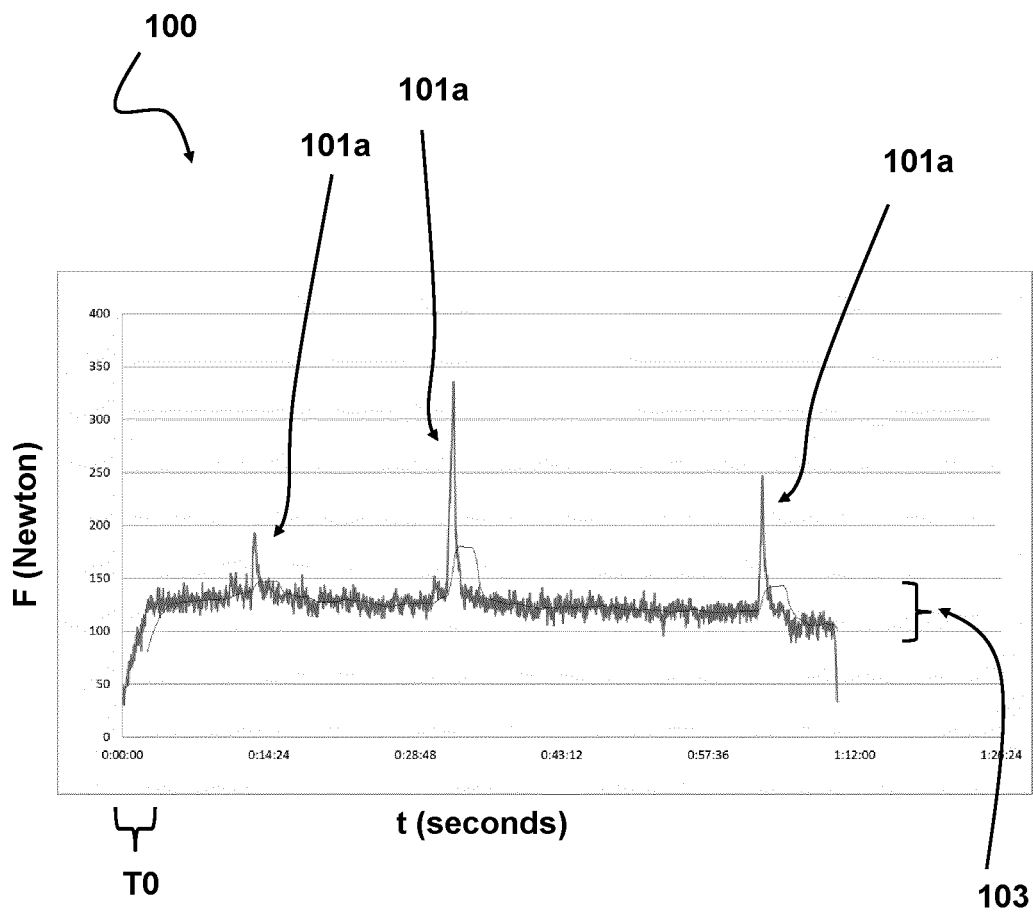
FIG. 10 shows a graph of a monitored value.

FIG. 10 shows a graph 100 of a monitored value indicative of a force (indicative of pressure) applied to the build material in the build material reservoir of the nozzle for enabling discharge of filaments through the nozzle opening. The graph shows an initialization time interval TO in which the force is stabilized towards a plateau level 103. The force value indicative of the pressure value is monitored by the processing unit in order to identify local spikes 101a and/or dips 101b. The spikes may have different characteristics (e.g. shape, peak amplitude, etc.) which can be further taken into account for determining the severity of the deposition defect in the porous structure linked thereto.

As a result of a clogging of the nozzle, the pressure value may momentarily increase or be increased until sufficient pressure is obtained for pushing the clogged build material out of the nozzle. In the shown example, the nozzle has been clogged three times for a relatively long period of time. As a result of the clogging, the build material could no longer flow normally (reduced flow rate) and the pressure or force employed for pushing the build material out of the nozzle significantly and suddenly increased. The nozzle opening is unblocked, and a significant amount of build material comes out of the nozzle in one go because of the pressure build-up. The pressure stabilizes again and printing can continue with the force/pressure value remaining within a plateau level.

The processing unit can be configured to detect a position of an irregular rising and/or falling of the pressure value, estimate the location of the weakness of the resulting deposition defect, and determine or estimate an overall strength of the porous structure. In some examples, the overall strength is determined using a model.

It will be appreciated that a spike or peak in the pressure/force value can be considered as a sharp rise (i.e. sudden steep increase) followed by a sharp decline. This sharp momentary increase in pressure value or value indicative of the pressure value can result in a deposition irregularity. The reverse also applies to a dip (cf. negative peak).

The force F required for a smaller nozzle diameter can be greater than the force required for a larger nozzle diameter. A build material with a same viscosity is to be pressed through a smaller opening, requiring a greater force for extruding the build material from the nozzle opening. The initialization time to obtain the force may also be longer with a smaller nozzle diameter. This start-up time is measured from the moment the pressure build-up is started (so the piston touches the build material) until the pressure has stabilized. This can be due to the fact that the set flow rate for this diameter can also be smaller, as a result of which e.g. the spindle may rotate more slowly such that it can take longer to reach the specified pressure. The time and force needed to stabilize the flow (cf. stabilization time TO) can be greater for smaller nozzle diameters. The controller may be arranged to take this into account when carrying out the method according to the invention.

Figure 11:
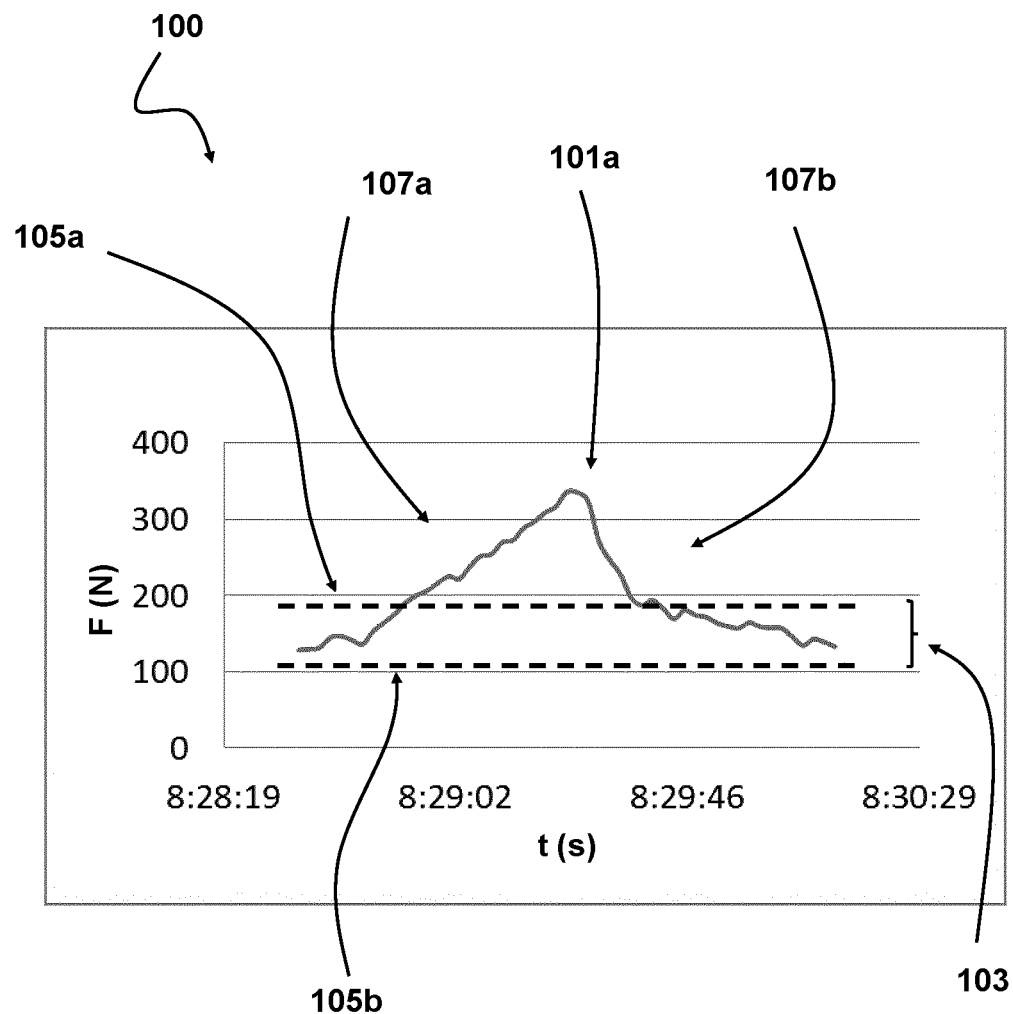
FIG. 11 shows a graph of a monitored value.

FIG. 11 shows a graph 100 of a monitored force value indicative of a pressure applied to the build material in the build material reservoir of the nozzle. This graph 100 represents a zoomed in portion at a peak 101a.

The force momentarily spikes and breaks out of the plateau level range 103 before it returns to a value within the plateau level range 103. This is identified by the processing unit as an irregular rising of the force with respect to the plateau level range 103. The one or more irregular risings and/or fallings can be linked to deposition defects in the porous structure. Advantageously, the location of the deposition defects can also be determined.

Figure 12:
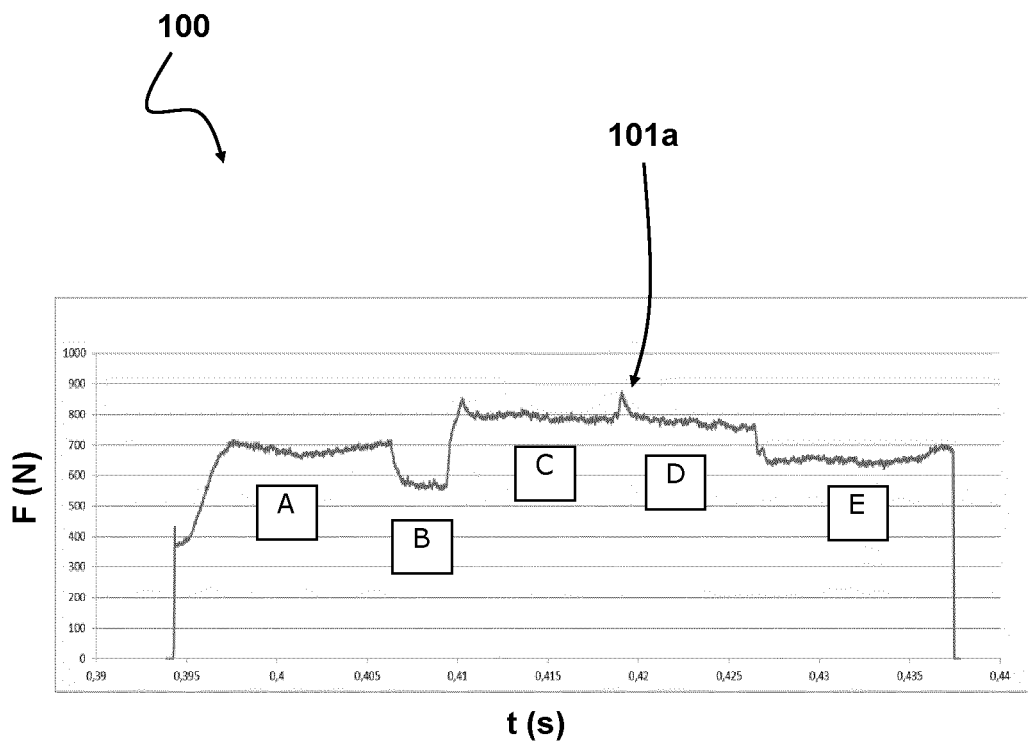
FIG. 12 shows a graph of a monitored value.

FIG. 12 shows a graph 100 of a monitored force value indicative of a pressure applied to the build material in the build material reservoir of the nozzle. The force has different plateau levels in different time intervals. The flow rate of build material being discharged through the nozzle opening may be set by the controller. The force being applied may vary for keeping the flow rate substantially constant. For example, as more build material is to be pushed out from a same opening area of the nozzle, more force/pressure may be needed for achieving this. Furthermore, the load cell may indicate different values if filaments are deposited for longer periods of time. For example, in area E a same flow may be obtained as in area A. However, the measured force may be slightly lower as the amount of build material in the reservoir is reduced which influences the friction that is exerted on the wall of the reservoir during deposition of the filaments. If there is less build material present in the reservoir during deposition of a filament, the force can be smaller to force the pasta through the reservoir.

For the shown example in FIG. 12, the nozzle has a diameter of 400 micrometer, and the regions A to E in the graph 100 have the following set flow rate:

| Area | Flow (ul/min) |
|------|---------------|
| A    | 200           |
| B    | 100           |
| C    | 300           |
| D    | 350           |
| E    | 200           |

Figure 13:
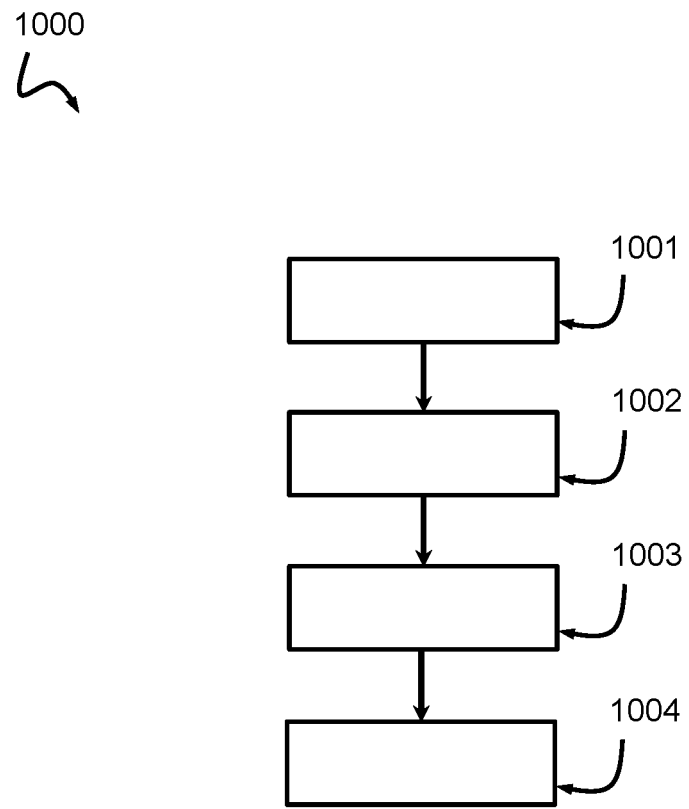
FIG. 13 shows a schematic diagram of a method.

FIG. 13 shows a schematic diagram of a method 1000 for manufacturing a three-dimensional porous structure. In a first step 1001, an extrusion unit is provided comprising a nozzle with a nozzle outlet and a build material reservoir, the build material reservoir being in fluid communication with said nozzle outlet. In a second step 1002, filaments are deposited, by means of the extrusion unit, in a predetermined interconnected arrangement in a plurality of stacked layers for forming a porous structure with interconnected pores. In a third step 1003, a pressure value indicative of a pressure being applied on the build material in the build material reservoir of the nozzle during deposition of the filaments is monitored, by means of a measuring unit. In a fourth step 1004, the monitored pressure value is processed by means of a processing unit for detecting one or more deposition irregularities in the formed porous structure by identifying an irregular rising and/or falling of the pressure value with respect to a plateau level reached during deposition. During the irregular rising the pressure value momentary spikes before it returns to its plateau level. During the irregular falling the pressure value momentary drops before it returns to its plateau level. Furthermore, the one or more identified deposition irregularities are linked to one or more deposition defects in the porous structure by means of the processing unit.

The invention provides for a method for evaluating whether a structural condition of a manufactured porous structure is suitable for a particular function based on results obtained by means of the processing unit.

Advantageously, the monitored pressure value data is used for detection and/or monitoring of deposition defects in the porous structure. The measuring unit can include at least one load sensor which can provide a measurement of the dynamic pressure values exerted on the build material in the build material reservoir during deposition of the filaments. In resulting pressure value profiles, a plateau level can be reached during deposition. One or more positive peaks (cf. spike) or negative peaks (cf. dips) breaking out of the plateau level can be detected. The peaks in pressure value are mainly the result of abnormalities during deposition. For instance, a spike may occur when the nozzle opening is at least partially blocked. Furthermore, a dip may occur when an air void passes the nozzle opening. Such sources of inequalities in the pressure value can be accurately evaluated using the system according to the invention. In this way, defects in the porous structure can be detected or evaluated. Also the manufacturing of the porous structure can be hastened, as the process may be cancelled and restarted from scratch if the one or more detected defects are too severe. The pressure value can be monitored and can be effectively adjusted such as to compensate for identified pressure irregularities.

It will be appreciated that the method may be at least partially computerized. The processing unit may include at least one processor configured to receive one or more signals comprising one or more pressure value data representative of one or more loads or pressures applied on the build material during deposition of the filaments for forming the porous structure. The processing unit may include data-acquisition means configured to collect said one or more pressure value data from the received one or more signals.

Optionally, the measurement data is wirelessly communicated to one or more remote devices including the processing unit. Optionally, the one or more remote devices are configured to perform further analysis of the measurement data.

The measuring unit may further include signal output means for outputting measurement data by means of a signal. Optionally, the system is further configured to generate output data comprising a summary of the affected location of the porous structure, a type of defect, and/or a severity of defect. In an example, the system further includes a reporting unit.

Optionally, the system includes at least one display unit for reading out a display of the pressure values measured by the system. The display unit may be configured to show analyzed pressure value data (e.g. detected events, fluctuations or patterns). The system may further include transfer means for transferring the measurement data and/or the analyzed data.

Optionally, the system includes a pressure value indication unit including display means arranged for providing an acoustic and/or haptic feedback, for example by means of a loudspeaker and/or piezoelectric element when an irregular rising and/or falling of the pressure value with respect to the plateau level is detected. It will be appreciated that such feedback may also be communicated by means of a mobile device (e.g. smart phone). One or more users may receive a notification. Other ways of notification are also possible.

The system may include a storage unit configured to store the measured pressure value data. The storage unit may for instance be provided in preferably detachable or removable storage media, such as memory cards. It is also possible that the measured data are carried out via physical output means such as a network cable or USB cable. Additionally or alternatively, the measured data is communicated to the cloud via internet. The system may include transmitting means for wireless transmission of measurement data to a storage server (e.g. cloud) or computer for storage thereof.

According to an aspect, the invention provides for a data carrier comprising instructions configured for performing when run on a programmable apparatus of a controller, the steps of the method according to the invention.

It will be appreciated that a dip can be considered as a momentary drop in a level of the quantity before it returns to its plateau level. The dip may include a brief downward slope followed by an upward one.

It will be appreciated that a plateau level may be a band or range in which the pressure value is expected to be during normal conditions during deposition of the filaments. Sudden abnormalities in the pressure value can bring the pressure value out of the range of the plateau level, resulting in deposition irregularities which can induce defects in the formed porous structure.

The manufacturing/printing process of the porous structure 10 can be based on an extrusion of a viscous build material through a thin needle. The build material may for instance be a highly viscous paste. By executing an extrusion movement in three dimensions, a structure can be built up layer by layer. One or more nozzles can be used for depositing filaments during the extrusion process. One of the important process parameters is the force exerted on the build material (e.g. paste) for discharging the build material from the nozzle opening of the nozzle. Additionally or alternatively, the flow of build material that is pushed out of the nozzle opening of the nozzle can also be considered as an important process parameter. Optionally, both parameters are monitored during the manufacturing process by using a force/pressure sensor (e.g. load cell) and a flow meter. However, it is also envisaged that only one of the two parameters, e.g. only the force/pressure sensor or only the flow meter, is employed. These measuring units can be implemented in various ways. In some examples, one or more measuring units are integrated at or within the nozzle.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method for manufacturing a three-dimensional porous structure, the method including the steps of:
    providing an extrusion unit comprising a nozzle with a nozzle outlet and a build material reservoir, the build material reservoir being in fluid communication with said nozzle outlet, the build material comprising particles of inorganic material dispersed in a binder and at least one solvent;
    depositing, by means of the extrusion unit, filaments of the build material in a predetermined interconnected arrangement in a plurality of stacked layers for forming the three-dimensional porous structure with interconnected pores;
    monitoring, by means of a measuring unit, a pressure value indicative of a pressure being applied on the build material in the build material reservoir during extrusion of the build material through the nozzle to achieve deposition of the filaments; and
    processing, by means of a processing unit, the monitored pressure value during a continuous extrusion phase for detecting one or more deposition irregularities by identifying an irregular rising and/or falling of the pressure value with respect to a plateau level determined from the actual measured pressure reached during the continuous extrusion phase, wherein during the irregular rising the pressure value momentary spikes by at least 15% above the plateau level before returning to the plateau level, wherein during the irregular falling the pressure value momentary drops by at least 15% below the plateau level before returning to the plateau level, and wherein the processing unit is configured to adjust at least one extrusion parameter in order to compensate for the irregular rising and/or falling of the pressure value.

2. The method according to claim 1, wherein adjusting an extrusion parameter involves at least one of:
    adjusting the pressure exerted to the build material in the build material reservoir and/or in the nozzle;
    adjusting the viscosity of the build material in the build material reservoir and/or in the nozzle;
    adjusting the build material flow rate;
    adjusting the nozzle opening;
    adjusting an actuation of an extrusion screw in the nozzle; or
    providing vibrations to the build material.

3. The method according to claim 2, wherein adjusting the viscosity of the build material in the build material reservoir is carried out by at least one of: adjusting a temperature of the build material, adjusting an amount of a solvent contained in the build material, or adding a release agent.

4. The method according to claim 1, wherein the measuring unit includes a load sensor positionable at a build material reservoir, between build material reservoir and nozzle, and/or at the nozzle.

5. The method according to claim 1, wherein the measuring unit is configured to monitor the pressure value indicative of the pressure being applied on the build material at a plurality of positions.

6. The method according to claim 1, wherein the processing unit is configured to link the one or more identified deposition irregularities to one or more deposition defects in the porous structure, wherein a severity of the deposition defect is determined based on an amplitude and/or shape of the irregular rising and/or falling of the pressure value with respect to the plateau level reached during deposition.

7. The method according to claim 1, wherein the processing unit is configured to determine a location of the identified deposition defect in the porous structure based on a position of the nozzle in a print path when the deposition irregularity is detected.

8. The method according to claim 6, wherein the processing unit is configured to determine one or more defect zones in the manufactured porous structure based on locations of identified one or more deposition defects in the porous structure.

9. The method according to claim 8, wherein the processing unit is configured to estimate an impact of the one or more defect zones on the structural integrity of the porous structure, based on at least one of a location and severity of the deposition defect at the defect zone, wherein the processing unit is configured to determine or estimate whether the printed porous structure complies with targeted properties, in particular one or more of strength and geometric effects, based on said estimate of the impact of the one or more weakened zones on the structural integrity of the porous structure.

10. The method according to claim 9, wherein the processing unit employs a computational model for determining or estimating the impact of the one or more defect zones on the structural integrity of the porous structure, wherein at locations of the one or more detected deposition defects the filament is modelled with a diameter based on the respective detected irregular rising or falling of the pressure value.

11. The method according to claim 1, wherein the manufacturing of the porous structure is cancelled prematurely if the one or more deposition irregularities are identified resulting in the one or more deposition defects in the porous structure.

12. The method according to claim 9, wherein the impact of the one or more weakened zones is estimated during deposition of the filaments for manufacturing the porous structure, wherein the manufacturing is prematurely cancelled based on said estimate of the impact.

13. The method according to claim 4, wherein the load cell includes a transducer arranged for creating an electrical signal whose magnitude is proportional to the force being measured, wherein the load cell is arranged to measure the force applied for discharging the build material out of the nozzle.

14. The method according to claim 1, wherein the measuring unit further includes a flow sensor configured to measure a flow value indicative of a flow of build material extruded through the nozzle outlet, wherein the processing unit is configured to process the flow data for determining one or more flow irregularities formed by an irregular rising and/or falling of the flow with respect to a plateau flow level during deposition.

15. The method according to claim 1, wherein the pressure value is determined by means of a first measuring unit and a second measuring unit, the first and second measuring units being placed at different locations, wherein the first measuring is configured to measure a first pressure value indicative of a pressure being applied on the build material in the build material reservoir, wherein the second measuring unit is configured to measure at least a second pressure value, wherein the method further comprises determining a difference between the first and at least one second pressure value and adjusting an extrusion parameter depending on the determined difference.

16. The method according to claim 1, wherein the plateau level has a baseline envelope forming a channel with an upper limit and a lower limit, wherein the irregular rising and/or falling of the pressure value with respect to the plateau level is identified when the pressure value breaks out of the baseline envelope of the plateau level.

17. A non-transitory computer readable medium comprising a program of instructions that, when executed by a processor, perform the method according to claim 1.

18. An additive manufacturing system for manufacturing a three-dimensional porous structure, the system comprising:
an extrusion unit including a nozzle with a nozzle outlet and a build material reservoir, the build material reservoir being in fluid communication with said nozzle outlet, the build material comprising particles of inorganic material dispersed in a binder and at least one solvent;
an extrusion unit configured for depositing filaments of the build material in a predetermined interconnected arrangement in a plurality of stacked layers for forming the three-dimensional porous structure with interconnected pores;
a measuring unit configured for monitoring a pressure value indicative of a pressure being applied on the build material in the build material reservoir during extrusion of the build material through the nozzle to achieve deposition of the filaments; and
a processing unit configured for processing the monitored pressure value during a continuous extrusion phase for detecting one or more deposition irregularities by identifying an irregular rising and/or falling of the pressure value with respect to the plateau level determined from the actual measured pressure reached during the continuous extrusion phase, wherein during the irregular rising the pressure value momentary spikes by at least 15% above the plateau level before returning to the plateau level, wherein during the irregular falling the pressure value momentary drops by at leas 15% below the plateau level before returning to the plateau level, and wherein the processing unit is configured to adjust at least one extrusion parameter in order to compensate for the irregular rising and/or falling of the pressure value.

* * * * *